United States Patent
Agarwal et al.

(10) Patent No.: US 10,237,914 B2
(45) Date of Patent: Mar. 19, 2019

(54) S2 PROXY FOR MULTI-ARCHITECTURE VIRTUALIZATION

(71) Applicant: Parallel Wireless, Inc., Nashua, NH (US)

(72) Inventors: Kaitki Agarwal, Westford, MA (US); Rajesh Kumar Mishra, Westford, MA (US); Jitender Arora, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/678,104

(22) Filed: Aug. 15, 2017

(65) Prior Publication Data

US 2018/0049275 A1  Feb. 15, 2018

Related U.S. Application Data

(60) Provisional application No. 62/375,341, filed on Aug. 15, 2016.

(51) Int. Cl.
*H04W 88/16* (2009.01)
*H04W 84/04* (2009.01)
(Continued)

(52) U.S. Cl.
CPC ............ *H04W 88/16* (2013.01); *H04W 24/02* (2013.01); *H04W 36/0022* (2013.01);
(Continued)

(58) Field of Classification Search
CPC ....... H04W 88/16; H04W 40/02; H04W 4/16; H04W 84/045; H04W 84/18;
(Continued)

(56) References Cited

U.S. PATENT DOCUMENTS

| 8,139,541 B2 | 3/2012 | Ejzak et al. |
| 8,787,331 B2 | 7/2014 | Liu et al. |

(Continued)

FOREIGN PATENT DOCUMENTS

| EP | 1560378 B1 | 11/2012 |
| WO | 2013025554 A1 | 2/2013 |

(Continued)

OTHER PUBLICATIONS

Konstantinos Samdanis, Xavier Costa-Perez, Vincenzo Sciancalepore, "From Network Sharing to Multi-tenancy: The 5G Network Slice Broker," NEC Europe Ltd., Germany, retrieved from https://arxiv.org/pdf/1605.01201.pdf.

(Continued)

*Primary Examiner* — Kashif Siddiqui
(74) *Attorney, Agent, or Firm* — Michael Saji

(57) ABSTRACT

A gateway situated between the RAN and the core network may provide 2G/3G/4G/Wi-Fi convergence for nodes in a network on a plurality of radio access technologies. In some embodiments, a convergence gateway is described that allows for legacy radio access network functions to be provided by all-IP core network nodes. A multi-RAT gateway provides 2G/3G Iuh to IuPS interworking, IuCS to VoLTE interworking via a VoLTE proxy, IuPS and 4G data local breakout or S1-U interworking, and 2G A/IP and Gb/IP to VoLTE and S1-U/local breakout interworking. The multi-RAT gateway may thereby support all voice calls via VoLTE, and all data over S1 or local breakout, including VoLTE. The multi-RAT gateway may provide self-organizing network (SON) capabilities for all RATs. A multi-RAT base station may provide 2G and 3G front-end interworking to Iuh.

13 Claims, 12 Drawing Sheets

(51) Int. Cl.

| | | |
|---|---|---|
| H04W 84/18 | (2009.01) | |
| H04W 88/10 | (2009.01) | |
| H04W 88/14 | (2009.01) | |
| H04W 88/18 | (2009.01) | |
| H04W 92/04 | (2009.01) | |
| H04W 92/06 | (2009.01) | |
| H04W 92/14 | (2009.01) | |
| H04W 24/02 | (2009.01) | |
| H04W 36/00 | (2009.01) | |

(52) U.S. Cl.
CPC .......... *H04W 84/045* (2013.01); *H04W 84/18* (2013.01); *H04W 88/10* (2013.01); *H04W 88/14* (2013.01); *H04W 88/182* (2013.01); *H04W 92/045* (2013.01); *H04W 92/06* (2013.01); *H04W 92/14* (2013.01)

(58) Field of Classification Search
CPC ... H04W 88/10; H04W 88/14; H04W 88/182; H04W 92/045; H04W 92/06; H04W 92/14
See application file for complete search history.

(56) References Cited

U.S. PATENT DOCUMENTS

| | | |
|---|---|---|
| 8,824,430 B2 | 9/2014 | Ioannidis |
| 8,855,058 B2 | 10/2014 | Lim et al. |
| 8,887,070 B1 | 11/2014 | Hecht et al. |
| 9,078,078 B1 | 7/2015 | Fine |
| 9,185,543 B2 | 11/2015 | Liu et al. |
| 9,198,021 B2 | 11/2015 | Tomici et al. |
| 9,241,292 B2 | 1/2016 | Jain |
| 9,510,256 B2 | 11/2016 | Krishna et al. |
| 9,591,031 B2 | 3/2017 | Cartmell et al. |
| 2004/0082328 A1 | 4/2004 | Japenga et al. |
| 2005/0282572 A1 | 12/2005 | Wigard et al. |
| 2008/0002669 A1 | 1/2008 | O'Brien et al. |
| 2008/0207269 A1 | 8/2008 | Byrne et al. |
| 2009/0213760 A1* | 8/2009 | Shin .................... H04W 74/002 370/254 |
| 2010/0130205 A1 | 5/2010 | Jung et al. |
| 2010/0329244 A1 | 12/2010 | Buckley et al. |
| 2011/0267943 A1 | 11/2011 | Huang et al. |
| 2012/0052866 A1 | 3/2012 | Froehlich et al. |
| 2012/0082073 A1 | 4/2012 | Andreasen et al. |
| 2012/0120831 A1 | 5/2012 | Gonsa et al. |
| 2012/0257598 A1 | 10/2012 | Karampatis et al. |
| 2013/0003697 A1 | 1/2013 | Adjakple et al. |
| 2013/0095862 A1 | 4/2013 | Bejerano et al. |
| 2013/0121206 A1 | 5/2013 | Turányi et al. |
| 2013/0329567 A1 | 12/2013 | Mathias et al. |
| 2014/0050208 A1 | 2/2014 | Annaluru et al. |
| 2014/0064156 A1 | 3/2014 | Paladuga et al. |
| 2014/0223538 A1 | 8/2014 | Van De Velde et al. |
| 2014/0269269 A1 | 9/2014 | Kovvali et al. |
| 2014/0286308 A1 | 9/2014 | Lee et al. |
| 2014/0293959 A1 | 10/2014 | Singh et al. |
| 2014/0308959 A1 | 10/2014 | De Benedittis et al. |
| 2014/0341109 A1* | 11/2014 | Cartmell ............... H04L 45/308 370/328 |
| 2015/0003420 A1 | 1/2015 | Vangala et al. |
| 2015/0009826 A1 | 1/2015 | Ma et al. |
| 2015/0063295 A1 | 3/2015 | Himayat et al. |
| 2015/0063346 A1 | 3/2015 | Eswara et al. |
| 2015/0098394 A1 | 4/2015 | Corcoran et al. |
| 2015/0257051 A1 | 9/2015 | Rao et al. |
| 2015/0359020 A1 | 12/2015 | Reynaud et al. |
| 2016/0037432 A1 | 2/2016 | Lin et al. |
| 2016/0080431 A1 | 3/2016 | Reddy et al. |
| 2016/0227449 A1 | 8/2016 | Sivavakeesar et al. |
| 2017/0070923 A1 | 3/2017 | Li et al. |
| 2017/0156086 A1 | 6/2017 | Tomici et al. |
| 2018/0049095 A1* | 2/2018 | Mishra ................. H04W 40/02 |

FOREIGN PATENT DOCUMENTS

| | | |
|---|---|---|
| WO | 2014207712 A1 | 12/2014 |
| WO | 2016083524 A1 | 6/2016 |

OTHER PUBLICATIONS

PCT International Search Report for PCT/US17/47038, dated Mar. 6, 2018.

Justin Ma, WCDMA HO Call Flows, Jun. 2014, available at https://www.slideshare.net/JaChangMa/wcdma-hocallflowv2014-0625.

Schulzrinne, H., Casner, S., Frederick, R. Jacobson, V., "RTP: A Transport Protocol for Real-Time Applications," Network Working Group, RFC 1889, Jan. 1996, retrieved from https://tools.ietf.org/pdf/rfc1889.pdf.

3rd Generation Partnership Project, 3GPP TS 25.304 V10.0.0 (Mar. 2011), "3rd Generation Partnership Project; Technical Specification Group Radio Access Network; User Equipment (UE) Procedures in Idle Mode and Procedures for Cell Reselection in Connected Mode (Release 10)," Mar. 2011, V10.0.0.

Loughney, J., Sidebottom, G., Coene, L., Verwimp, G., Keller, J., Bidulock, B., "Signaling Connection Control Part User Adaption Layer (SUA)," Network Working Group, RFC 3868, Oct. 2004, retrieved from https://tools.ietf.org/pdf/rfc3868.pdf.

3rd Generation Partnership Project, 3GPP TR 29.903 V6.0.0 (Dec. 2004), "3rd Generation Partnership Project; Technical Specification Group Core Networks; Feasibility Study on SS7 signaling transport in the core network with SCCP-User Adaption (SUA) layer (Release 6)," Dec. 2004, V6.0.0.

"SIP Number Portability Parameters," VoIP Info, Dec. 20, 2010, retrieved from https://www.voip-info.org/wiki/view/SIP+Number+Portability+Parameters.

Rosenberg, J., Schulzrinne, H., Camarillo, G., Johnston, A., Peterson, J., Sparks, R., Handley, M., Schooler, E., "SIP: Session Initiation Protocol," Network Working Group, RFC 3261, Jun. 2002, retrieved from https://www.ietf.org/rfc/rfc3261.txt.

Zahid Ghadialy, "CAMEL: An Introduction," 3G4G.CO.UK, Jul. 25, 2004, retrieved from http://www.3g4g.co.uk/Tutorial/ZG/zg_camel.html.

Michael Finneran, "Apple Reinvents Mobile UC," No Jitter, Jun. 14, 2016, retrieved from http://www.nojitter.com/post/240171745/apple-reinvents-mobile-uc.

* cited by examiner

S2 PROXY FOR MULTI-ARCHITECTURE VIRTUALIZATION

CROSS-REFERENCE TO RELATED APPLICATIONS

This application claims the benefit of priority under 35 U.S.C. § 119(e) of U.S. Provisional Patent Application No. 62/375,341, filed on Aug. 15, 2016 and entitled "S2 Proxy for Multi-Architecture Virtualization," which is hereby incorporated by reference in its entirety for all purposes. The present application also hereby incorporates by reference for all purposes U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. patent application Ser. No. 15/464,333, "IuGW Architecture," filed Mar. 20, 2017; U.S. patent application Ser. No. 14/642,544, "Federated X2 Gateway," filed on Mar. 9, 2015; U.S. patent application Ser. No. 14/936,267, "Self-Calibrating and Self-Adjusting Network," filed on Nov. 9, 2015; U.S. patent application Ser. No. 14/806,594, "Signaling Storm Reduction from Radio Networks," filed Jul. 22, 2015; U.S. patent application Ser. No. 14/822,839, "Congestion and Overload Reduction," filed Aug. 10, 2015; and U.S. Pat. App. No. 61/724,312, "Method of optimizing Paging over LTE radio," filed Nov. 9, 2012.

BACKGROUND

In many environments, it is important to support voice calling, including in networks where Long Term Evolution (LTE) is deployed. However, LTE does not support voice calling over legacy networks, instead providing voice capability via its own standard, Voice over LTE (VoLTE). There is consequently a need for compatibility with legacy voice calling, including circuit-switched (CS) voice calling, that is currently met imperfectly, typically by providing both a 2G/3G core network and a parallel LTE core network. As both networks have cumulative maintenance and operational expense (opex) requirements, the new network is significantly more expensive.

As well, with the requirement that wireless operators support all generations of radio technologies, and the expense of maintaining 2G, 3G, 4G and upcoming 5G infrastructures, operators have desired to transition their core infrastructure to remove legacy components and converge to a single IP core. This will help them move to all IP, an all-virtualized core network infrastructure and reduce not only capital expenditures (capex) but also operational expenditures (opex) significantly.

SUMMARY

Systems and methods are disclosed for a network convergence protocol proxy and interworking gateway.

In some embodiments, a proxy provides 2G/3G/4G/5G/Wi-Fi virtualization for nodes in a network on a plurality of radio access technologies. In some embodiments the convergence proxy is divided into a radio access technology (RAT)-specific front-end portion, an S2/S2x/S1 back-end portion for data network convergence, and a CS back-end portion for voice network convergence. The Convergence proxy is placed in the network between one or more radio access networks and an operator core network. To the radio access networks, the convergence proxy communicates to each RAN node using the appropriate RAT and interface, i.e., Iuh, S1, Ta, SWu. To the core network, the Convergence proxy communicates to a packet gateway (EPC) using the S1 or S2 interface, in essence presenting the various RATs to the core network as if via a Wi-Fi security gateway or as a eNodeB. In some scenarios convergence proxy can absorb part of SGSN and MME functionality and do local breakout of data and eliminates the need for EPC. In that case core network consists of mainly authentication, billing, LI server with convergence proxy. Convergence proxy is a virtualized platform that runs legacy core network functions and also enables and interfaces with future 5G core network functions such as MCE, MBMS-GW, IOT GW, analytics server, in some embodiments.

In some embodiments, a convergence gateway is described that allows for legacy radio access network functions to be provided by all-IP core network nodes. A multi-RAT gateway provides 2G/3G Iuh to IuPS interworking, IuCS to VoLTE interworking via a VoLTE proxy, IuPS and 4G data local breakout or S1-U interworking, and 2G A/IP and Gb/IP to VoLTE and S1-U/local breakout interworking. The multi-RAT gateway may thereby support all voice calls via VoLTE, and all data over S1 or local breakout, including VoLTE. The multi-RAT gateway may provide self-organizing network (SON) capabilities for all RATs. A multi-RAT base station may provide 2G and 3G front-end interworking to Iuh.

In one embodiment, a system for multi-radio access technology (multi-RAT) telecommunications networking is disclosed, comprising: a multi-RAT gateway, wherein the multi-RAT gateway may further comprise: an inbound Iuh interface for handling inbound signaling, call, and user data flows on either or both of a 2G RAT or a 3G RAT; an inbound IuCS interface for handling inbound call data flows on either or both of the 2G RAT or the 3G RAT, the inbound IuCS interface being coupled to the inbound Iuh interface; an inbound IuPS interface for handling inbound user data flows on either or both of the 2G RAT or the 3G RAT, the inbound IuPS interface being coupled to the inbound Iuh interface; an inbound S1-AP interface for handling 4G inbound signaling data flows; an inbound S1-U interface for handling 4G inbound user data flows; a Voice over LTE (VoLTE) interworking proxy for performing interworking from inbound call data flows, the VoLTE interworking proxy being coupled to the inbound IuCS interface; and an outbound data flow router for routing inbound user data flows on either, some, or all of 2G, 3G, or 4G user data flows to either an outbound S1 interface or an outbound local breakout IP interface.

The VoLTE interworking proxy may be further coupled to the outbound data flow router such that outbound VoLTE traffic flows destined for an Internet Protocol Multimedia Subsystem (IMS) core network may be routed to either the outbound S1 interface or the outbound local breakout IP interface, and the inbound S1-AP interface and the inbound S1-U interface may be further coupled to the outbound data flow router. The inbound S1-U interface may be further configured to route inbound VoLTE traffic flows to the outbound data flow router. The multi-RAT gateway may further comprise local core network functions, the local core network functions comprising a local serving GPRS support node (SGSN) function, a local gateway GPRS support node (GGSN) function, and a local mobility management entity (MME) function, the local core network functions providing termination of data flows. The system may further comprise an IMS core network for providing voice call anchoring for VoLTE voice data flows.

Each of the radio access technology gateway functions may provide inbound interfaces for signaling, voice calls, and user data. Each of the radio access technology gateway functions may provide either interworking for inbound flows to an outbound IP-based interface or routing to a local core network function that acts to terminate inbound flows. The system may further comprise a multi-radio access technology (multi-RAT) base station supporting 2G with an Iuh signaling interface, 3G with an Iuh signaling interface, and 4G with an S1-AP signaling interface. The multi-RAT gateway may further comprise a 2G base station interface providing A/IP and Gb/IP signaling, voice call, and data inbound interfaces, and A/IP and Gb/IP interworking to outbound IP-based data or to an outbound Voice over LTE (VoLTE) interface via a VoLTE interworking proxy. The system may further comprise a multi-radio access technology (multi-RAT) base station supporting a wireless local area networking (WLAN) radio access technology (RAT) with an S2a or S2b signaling interface, and The multi-RAT gateway further comprises support for S2a/S2b signaling, Voice over LTE (VoLTE) proxy interworking for S2a/S2b voice calls, and support for redirection of S2a/S2b data to an operator core network packet gateway (PGW) or to the Internet via local breakout. The multi-RAT gateway may further comprise a Session Initiation Protocol (SIP) protocol connection interworking proxy for interworking IuCS and A/IP calls to Voice over LTE (VoLTE) calls, or for interworking SIP calls to IuCS calls. The SIP protocol connection interworking proxy may further comprise a transcoder.

The multi-RAT gateway may provide an application programming interface (API) to enable interaction of a Voice over IP (VoIP) smartphone application with a voice call at the multi-RAT gateway without requiring support in a 3G circuit-switched core network or an IP Mobile Subsystem (IMS) core network. The multi-RAT gateway may further comprise a self-organizing network (SON) module coupled to each of the inbound and outbound interfaces and proxies, the SON module for monitoring network state, subscriber information, and/or call state information across radio access technologies and proactively reconfiguring operating parameters at the multi-RAT gateway.

In another embodiment, a system for multi-radio access technology (multi-RAT) telecommunications networking is disclosed, comprising: a multi-RAT gateway, the multi-RAT gateway configured to provide signaling and data gateway functions for a 3G RAT, a 4G RAT, and a wireless local area networking (WLAN) RAT. The 3G RAT may further comprise at least one 3G base station coupled to the multi-RAT gateway over an Iuh interface, and the multi-RAT gateway may be in communication with, and serves as a gateway for, a 3G packet core network node, a 3G circuit core network node, and a 4G evolved packet core (EPC) network node when in communication with the 3G RAT, the 4G RAT, or the WLAN RAT for signaling, voice, or user data flows received via the Iuh interface, thereby virtualizing the existing core and adding more capacity by offloading signaling and data.

The multi-RAT gateway may further comprise an Internet Protocol (IP) local breakout interface for routing data packets from the 3G RAT and the 4G RAT over the public Internet, the IP local breakout interface providing call detail record (CDR) generation, thereby reducing a need to scale a 4G packet gateway (PGW) and a 3G gateway GPRS support node (GGSN) and reducing Internet traffic latency. The multi-RAT gateway may further comprise a 3G mobile switching center (MSC) function, the virtual MSC function being scalable, the virtual MSC function being able to receive inbound IuPS and IuCS data flows and map the inbound IuPS and IuCS data flows to either the 3G circuit core network node or the 3G packet core network node, thereby enabling traffic flow localization and topology-enhanced handover and reducing a need for scaling MSC and 3G circuit and packet core network nodes. The multi-RAT gateway provides an application programming interface (API) to enable interaction of a Voice over IP (VoIP) smartphone application with a voice call at the multi-RAT gateway without requiring support in a 3G circuit-switched core network or an IP Mobile Subsystem (IMS) core network.

In another embodiment, a system for multi-radio access technology (multi-RAT) telecommunications networking is disclosed, comprising: a multi-RAT gateway, the multi-RAT gateway configured to provide signaling and data gateway functions for a 3G RAT, a 4G RAT, and a wireless local area networking (WLAN) RAT, wherein the 3G RAT may further comprise at least one 3G base station coupled to the multi-RAT gateway over an Iuh interface, wherein the multi-RAT gateway may further comprise a 4G mobility management entity (MME) function and a 3G general GPRS serving node (GGSN) function, the MME function and the GGSN function providing packet-based data services to the 3G RAT and the 4G RAT, the multi-RAT gateway further in communication with, and serves as a gateway for, a 3G circuit core network node and an IP Multimedia Subsystem (IMS) core network node.

DETAILED DESCRIPTION

Figure 1:
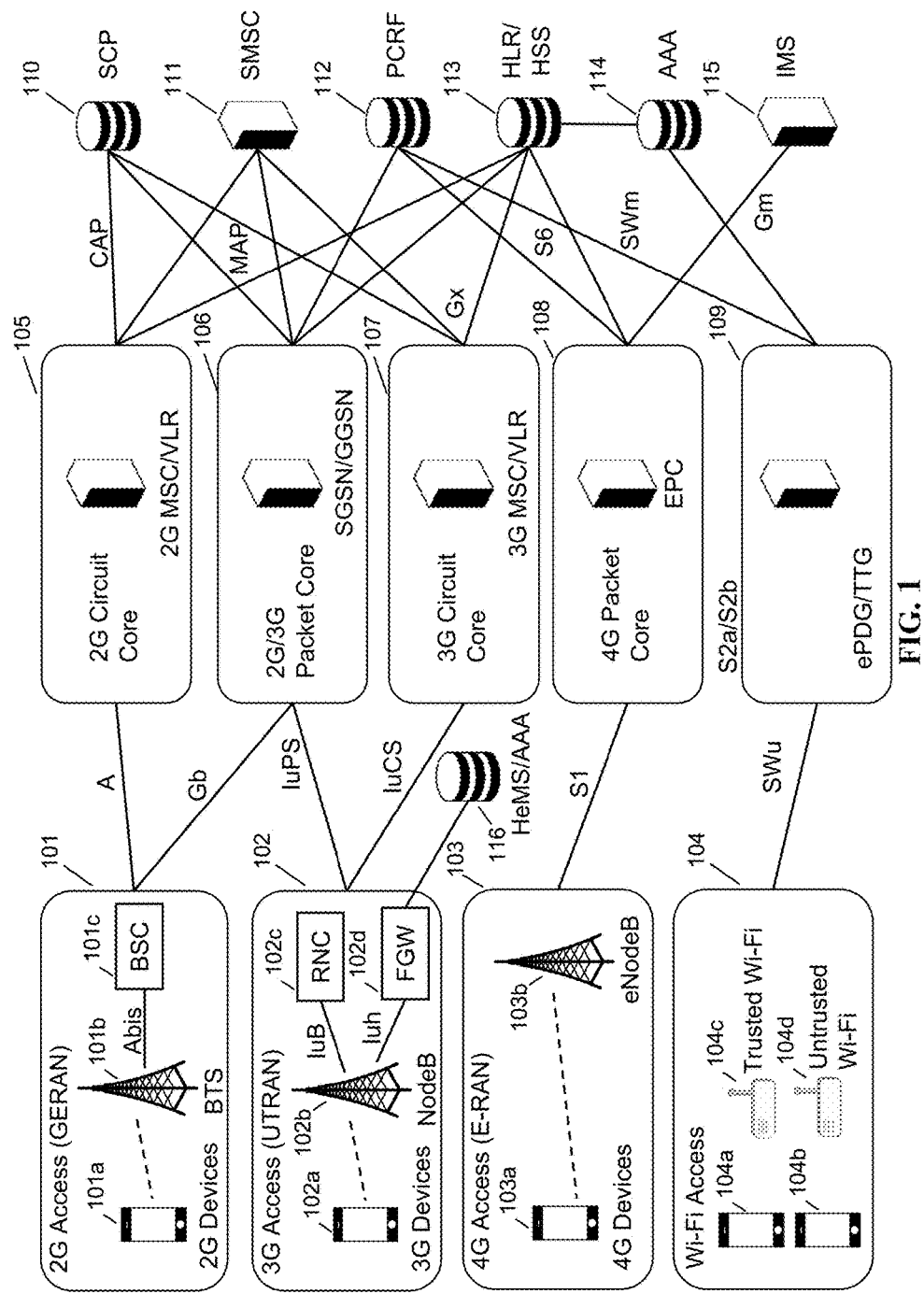
FIG. 1 depicts a prior art core network architecture.
Figure 2:
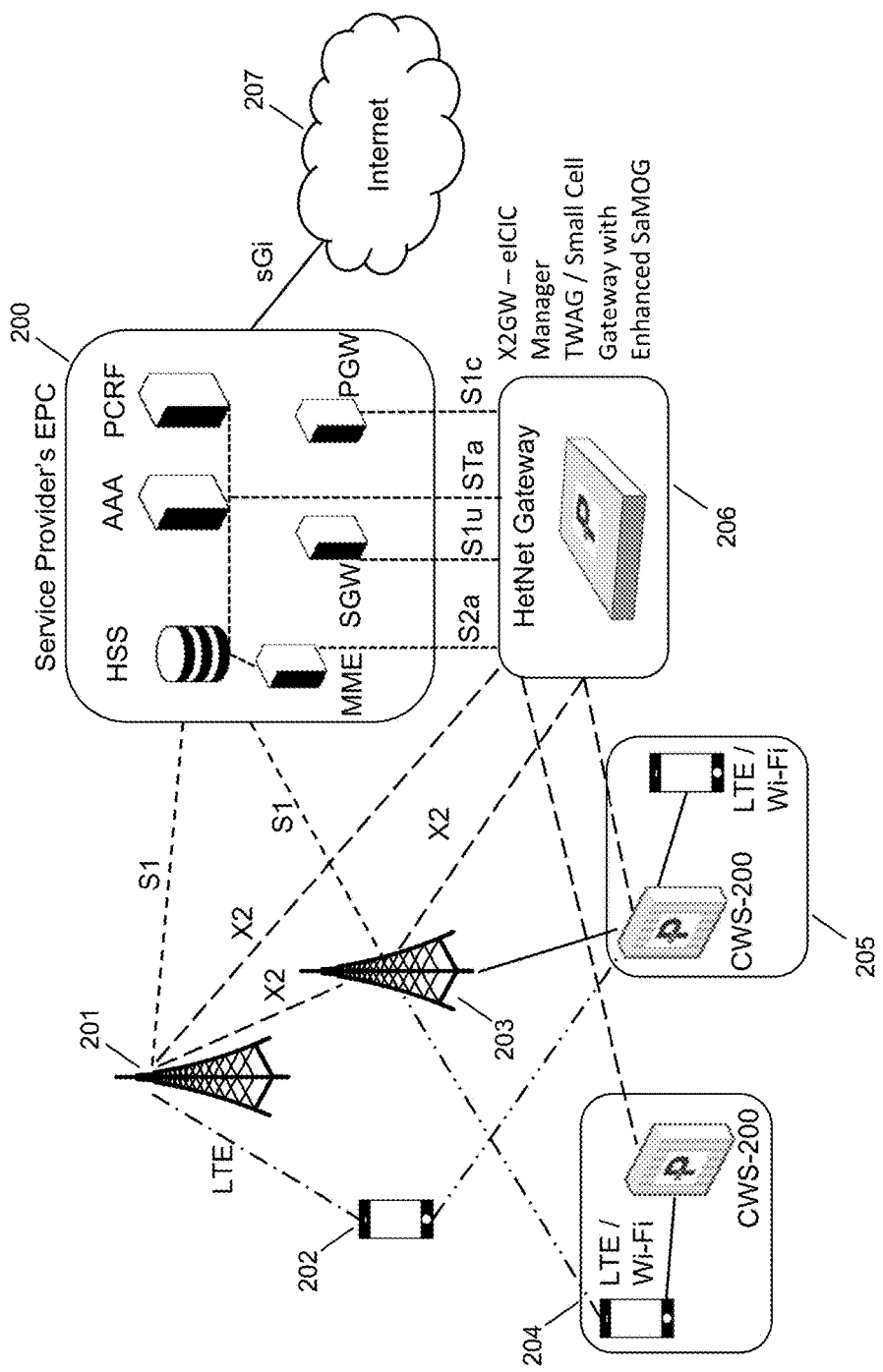
FIG. 2 is a network architecture diagram showing integration of Wi-Fi into an LTE core network, in accordance with some embodiments.

In currently-available systems, multiple radio access technologies are supported by the use of separate infrastructure for each radio access technology. For example, LTE eNodeBs are supported by MMEs, SGWs, PGWs, etc., and UMTS nodeBs are supported by SGSNs, GGSNs, MSCs etc., with little or no functionality shared between core network nodes. FIG. 1 shows the current architecture.

Reducing complexity by eliminating one or more network nodes in the core network has been difficult due to differences in functional divisions in the various RATs, as well as the difficulty in building and supporting backwards compatibility layers for each RAT. When interworking is required between each pair of RATs, development becomes expensive. Even when companies have attempted to build combination nodes, integration is expensive because supporting the superset of features on a given RAT (e.g., authentication, circuit switching, legacy protocol interworking) is difficult and expensive.

For example, an S1 interworking proxy node may be placed between an LTE eNodeB and an LTE core network (MME, SGW, PGW); an Iuh interworking proxy may be placed between a 3G nodeB and a 3G core network (SGSN, GGSN); an IuCS interworking proxy may be placed between a 3G nodeB and a 3G MSC; a circuit-switched media gateway may be placed between a 2G BTS and a 2G core network (SGSN and MSC); a Wi-Fi gateway according to the 3GPP spec could be placed between a Wi-Fi user device and a PGW; and so on. However, a multiplicity of devices is required to support all scenarios, leading to increased expense in operation of the core network.

Additionally, network operators are typically unwilling to decommission core network equipment that has been well-tested and continues to operate well. For example, this is the case for 2G and 3G legacy voice equipment, which provides voice call quality superior in many cases to VoLTE, which is not widely deployed. Elimination of these legacy network nodes is additionally difficult as a result.

Thus, although LTE hypothetically has the ability to unify all network protocols in an IP-only system, few or no LTE core network nodes exist today that can support all of the functions that are supported by the core network nodes of the UMTS network.

Various approaches are provided herein that provides connectivity and mobility to users using any of a plurality of radio access technologies, including LTE/LTE-A/LTE-U, 3G (UMTS), 3G (CDMA), 2G and 2.5G (EDGE), and Wi-Fi within a single architecture. In some embodiments a system is described wherein one or more RATs may be supported using a single front-end plugin for each RAT supporting a subset of RAT features, and without requiring support to be built out for all RAT features. In some embodiments support can be rolled out in sequential stages, for example, for network operators that have existing investments in infrastructure.

In some embodiments, a convergence gateway is enabled to interwork other radio access network interfaces with S1 or Iu, thereby providing connectivity to the RAN toward the core network and vital core network nodes such as authentication and mobility nodes. To the core network, a call or packet data session appears as an LTE call or bearer. To the user device, the call or session appears as a native RAT call/session, whether it is 2G, 3G, CDMA, or Wi-Fi.

The S2 interface (S2a, S2b) is an important interface for enabling the system described herein. S2, as described in 3GPP TS 23.402 and TR 23.852 (each hereby incorporated by reference in their entirety), is an interface for enabling wireless access gateways to permit mobile devices on non-3GPP networks to join 3GPP networks. Specifically, the S2 interface was designed to enable Wi-Fi and other IEEE networks to expose control functionality as well as data routing functionality, and to enable 3GPP networks to interoperate with eHRPD and CDMA networks, such as WiMAX and WCDMA networks, and interworking them to a 3GPP PGW gateway. Authentication and call anchoring is passed through the S2 interface and performed using the 3GPP network. In some embodiments the convergence proxy does not use S2 interface and uses local breakout or for data traffic while interworking the signaling messages with legacy components such as MSC and SGSN.

An additional important interface for enabling the system described herein is the S1 interface. While the S1-AP interface is used for providing signaling support for LTE eNodeBs, the S1-U interface is a tunneling interface suitable for tunneling IP data through to an LTE core network. Re-encapsulating packets received over another packet session, such as EDGE, Gb, IuPS, etc. into a GTP-U tunnel over the S1-U interface enables the S1 interface to be used for multiple RATs.

A third important building block of the solution described herein is the use of local breakout techniques for handling IP traffic. Other than voice calls connected over a circuit-switched protocol, the majority of traffic on wireless operator networks at this time travels over the operator network to a gateway, such as an LTE packet data network gateway (PGW), which then provides access to the Internet. This includes VoIP, web (HTTP), and other user-driven IP traffic. Certain IP traffic terminates within a mobile operator network and not on the public Internet, such as voice calls performed over VoLTE within the same operator's network; however, such calls may also be made by routing an IP session out to the public Internet and back to the operator's own network (e.g., hairpin routing).

Local breakout also is desirable sine in most or all deployments, the wireless base station has some backhaul that enables it to connect to an operator core network using underlying IP backhaul connectivity to the global Internet. The inventors have appreciated, and the embodiments described herein show, that it is possible to simplify the operator core network by directing most connections to traverse the Internet via this backhaul connection instead of using designated 2G, 3G, or 4G nodes within a core network to provide service. This technique, sometimes also called Selective IP traffic offload (SIPTO), or local IP access (LIPA) when used to refer to the use of non-operator-controlled IP networks, particularly by small cells, is enhanced and expanded upon to provide additional functionality in this disclosure.

Fourthly, as described above, many operators already have 3G core networks in place. In some embodiments, a simple approach is taken to retain compatibility with 3G voice calls at minimal expense. Instead of replacing the 3G core network completely, an existing 3G core network is left in place and pared down to the minimum of required components. By reusing and inexpensively maintaining the existing 3G core, compatibility is maintained with 3G technology, at no additional cost relative to the present day, without requiring the expense of purchasing new devices to replace the 3G core.

Otherwise, if an operator core network is a "greenfield" network, where 3G core networks have not been provisioned or built out, the core network can be built to support voice calling without a 3G core network and only with an IMS network, to provide voice over IP (VOIP)/VoLTE voice calling. This core network architecture enables the use of an all-IP network without legacy 3G circuit-switched calling.

FIG. 1 depicts a prior art core network architecture. On the left side of the diagram, four radio access technologies (RATs) are depicted, namely: 2G (otherwise known as GERAN), 3G (otherwise known as UTRAN), 4G (LTE or EUTRAN), and Wi-Fi access. The RATs correspond to different wireless access technologies supported by wireless clients, such as 3GPP user equipments (UEs) and Wi-Fi-equipped computers and mobile devices. In the middle of the diagram, each of the RATs has a corresponding core network that handles functions that include mobility management (e.g., handovers) and radio access coordination.

FIG. 1 is a schematic network architecture diagram for 3G and other-G prior art networks. The diagram shows a plurality of "Gs," including 2G, 3G, 4G, and Wi-Fi. 2G is represented by GERAN 101, which includes a 2G device 101a, BTS 101b, and BSC 101c. 3G is represented by UTRAN 102, which includes a 3G UE 102a, nodeB 102b, RNC 102c, and femto gateway (FGW, which in 3GPP namespace is also known as a Home nodeB Gateway or HNBGW) 102d. 4G is represented by EUTRAN or E-RAN 103, which includes an LTE UE 103a and LTE eNodeB 103b. Wi-Fi is represented by Wi-Fi access network 104, which includes a trusted Wi-Fi access point 104c and an untrusted Wi-Fi access point 104d. The Wi-Fi devices 104a and 104b may access either AP 104c or 104d. In the current network architecture, each "G" has a core network. 2G circuit core network 105 includes a 2G MSC/VLR; 2G/3G packet core network 106 includes an SGSN/GGSN (for EDGE or UMTS packet traffic); 3G circuit core 107 includes a 3G MSC/VLR; 4G circuit core 108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 110, the SMSC 111, PCRF 112, HLR/HSS 113, Authentication, Authorization, and Accounting server (AAA) 114, and IP Multimedia Subsystem (IMS) 115. An HeMS/AAA 116 is present in some cases for use by the 3G UTRAN. The diagram is used to indicate schematically the basic functions of each network as known to one of skill in the art, and is not intended to be exhaustive.

Noteworthy is that the RANs 101, 102, 103, 104 rely on specialized core networks 105, 106, 107, 108, 109, but share essential management databases 110, 111, 112, 113, 114, 115. More specifically, for the 2G GERAN, a BSC 101c is required for Abis compatibility with BTS 101b, while for the 3G UTRAN, an RNC 102c is required for Iub compatibility and an FGW 102d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

While the core network architecture as shown is effective, it is expensive to maintain and unnecessarily duplicates infrastructure. Conceptually only two main functions are provided to users: voice calls and packetized data. However, each RAT requires a different core network to be put in place to handle the same function. In the case of 3G, two core networks are put into place, one to handle circuit-based calls and one to handle packet-based calls and data. Wi-Fi is also not effectively integrated into the network. Additionally, no synergies are realized between the networks, as each operates independently of the others, even though many of them operate on the same IP-based underlying network. Not shown are the expensive air conditioning, power conditioning, property leasing agreements, and other physical plant expenses required to maintain each of these duplicate core networks.

An approach is described for combining each of the core networks into a minimal core network suitable for providing radio access to user devices that support LTE and beyond, while providing legacy support for other RATs. Each legacy RAT may be supported at the RAN level, but the core network for each RAT may be replaced by a single converged core network. To provide data service, the converged core network shall use the LTE framework, and shall use IP. To provide voice service, the converged core network shall use either a 3G circuit core network infrastructure (MSC, VLR) or a packet-based LTE infrastructure such as VoLTE. Interworking shall be provided to enable legacy core network nodes to be removed from the network.

The described approach has the advantage that several functions previously separated among several disparate core networks may be reunited into a single core network node, here called the convergence proxy/gateway. This enables network operators to perform optimizations across several RATs. As well, the convergence proxy may be built with modern hardware and software virtualization techniques that enable it to be scaled up and down as needed within the network to meet needs on any of the supported RATs, thereby enabling network expansion and virtualization. This architecture thus paves the way for increased numbers of connected nodes (e.g., for Internet of Things (IoT)), and for the increased bandwidth and densification as projected to be required by 5G.

The described approach also enables increased intelligence to be pushed to the edge of the network. When combined with the virtualization technology described in U.S. Pat. Pub. No. 20140133456 (PWS-71700US03), hereby incorporated by reference in its entirety for all purposes, which allows a virtualization gateway to act as a proxy to enable a large radio access network to be subdivided into independently managed sections, intelligence may be added in a large scale way to a large, heterogeneous radio access network by pushing the required intelligence out from the expensive to maintain core network to virtualization/convergence nodes situated one hop away from the edge of the network. This architecture allows new services to be provided, such as: content delivery caching, scaling, and optimization; data offload for local voice or local data breakout; specialized APIs for smartphone apps; VoIP and VoWiFi integration; within network free calling without using expensive international or long distance circuits or trunks; femto cell integration; machine-to-machine applications; integration of private enterprise RANs with the core network; core network sharing; and other services, each of which could provide an additional revenue stream.

A detailed explanation of how each RAT will be supported follows.

In some embodiments, 2G services may be provided by enabling a standard base station, or BTS, to connect to the convergence gateway directly via a standard BTS-MSC interface, the A interface. Software and hardware to enable 2G base stations according to the Global System for Mobile Communications (GSM) are readily available, including base station software to enable radio baseband functions and to handle interactions with a 2G GSM handset, such as the open source OpenBTS project. Such BTS software is often configured to use the A interface over an IP protocol backhaul link, and many operators have migrated their networks to run on IP and use a modified version of the A interface over IP links (A-over-IP). The convergence gateway may be configured with the appropriate A interface compatibility to enable it to interoperate with such BTSes from multiple vendors.

In some embodiments, the convergence gateway operates as a back-to-back user agent (B2BUA) or BTS/MSC proxy between a BTS and the 2G/3G MSC core network node, virtualizing the BTSes from the MSC and the MSC from the BTSes. The existing legacy 2G/3G MSC is able to handle circuit-switched calls, SS7 calls, and other types of calls that are difficult to simulate or interwork in the modern IP-based environment. This mode of operation does utilize an existing 2G/3G MSC core network node. However, as mentioned above, it is advantageous to be able to leverage the existing 2G/3G infrastructure to provide a solution that "just works" and preserves legacy compatibility without introducing additional cost.

In some embodiments the convergence gateway may use the Iuh interface, not the A interface, to enable an enhanced 2G base station or combined 2G/3G base station to communicate with it. Iuh is the interface used according to certain UMTS standards for communication over an IP link between a femto cell and a femto cell gateway, otherwise known as a home nodeB gateway, including nodeB registration (e.g., HNBAP) as well as control and user data messages (e.g., RANAP); Iuh supports transport of IuPS and IuCS user data flows, as well as signaling flows, and is therefore suitable for handling 2G calls. The base station in this case could be responsible for interworking between the A interface (or the Um interface) and the Iuh interface. The enhanced 2G base station could operate as a small cell as described below in relation to 3G services. The convergence gateway may use Iuh to provide signaling capability to the base stations.

In some embodiments, 3G services may be provided using a convergence gateway that is configured to act as a standard RNC, SGSN, and GGSN in relation to standard nodeB base stations. The base stations may communicate to the convergence gateway via the IuPS and IuCS interfaces. The convergence gateway may be configured to act as a B2BUA and proxy for the nodeBs toward communicating with a 3G MSC/VLR. The convergence gateway may be configured to virtualize the nodeB toward the core network. Alternately the convergence gateway may provide RNC, SGSN, and/or GGSN functions internally as software modules.

In some embodiments, 3G services may be provided using a nodeB in communication with the convergence gateway via the Iuh interface, as described above. The nodeB may be configured to act as a small cell according to the standard femto cell specifications, and the convergence gateway may treat the 3G nodeB as a standard 3G home nodeB.

IuCS interface communications may be proxied by the convergence gateway toward a 3G circuit core network node, the 3G MSC/VLR. Iuh and IuPS interface communications may be handled in several different ways: forwarding Iuh circuit-switched communications to an existing 3G core, interworking of IuPS to LTE or directly to IP, such as for local breakout, or terminating IuPS communications at the convergence gateway and providing the underlying IP packet data services via an underlying IP backhaul connection at the convergence gateway (e.g., local IP breakout). Each of the inbound service requests that is a request for IP is handled via interworking, and service requests for circuit connections are handled by forwarding to the 3G core. It is noted that voice calls in the present architecture are often provided using RTP and packet-based MSC nodes, and as such, the convergence gateway may make use of RTP that is encoded by the BTS or nodeB to provide 3G voice services. The use of RTP and IP provides advantages for both 3G and 4G services as described hereinbelow.

Additional functions may be provided by the convergence gateway in conjunction with 3G service, in some embodiments. In some embodiments, RTP streams that originate and terminate within a single RAN, or within a single sub-network managed by the convergence gateway, may be redirected at the convergence gateway back toward the RAN instead of unnecessarily traversing the core network; this is known as RTP localization. RTP streams are typically used by many 3G nodeBs to encode and transport voice calls over IP. In order to provide RTP localization in this fashion, no change in signaling on the control plane is required, and network address translation may be sufficient in many cases to provide this functionality for the data packets themselves.

In some embodiments, handover optimization and paging optimization may be performed, to reduce signaling and load due to handovers or paging on the core network. The term optimization here and throughout this disclosure is used only to mean enhancement or improvement, not to mean identification of a single best method. Handovers within the same RAN or sub-network managed by the convergence gateway may be performed without interaction with the core network. Paging may be reduced by keeping track of UEs within the RAN or sub-network. Further detail about paging and handover optimizations may be found in U.S. patent application Ser. Nos. 14/806,594, 14/822,839, and 61/724,312, each hereby incorporated by reference in their entirety.

In some embodiments, data traffic may be redirected away from the 3G core network to the Internet. According to the conventional UMTS architecture, packet-switched (PS) UMTS bearers are GTP-U tunnels for data that is intended to go to or from the public Internet are terminated on one end at the UE and at the other end at a core network gateway, such as a GGSN that provides connectivity to other networks, such as the public Internet. In the conventional UMTS architecture, the GGSN extracts an IP payload from the GTP-U tunnel and sends it over the Internet. By contrast, in the present disclosure, the convergence gateway may identify that certain traffic is intended for the public Internet or for other connected networks, and may perform the de-encapsulation function previously performed by the GGSN, thereby eliminating the need for the GGSN to perform this function.

In some embodiments, SGSN functionality may be performed at the convergence gateway. For example, the SGSN in the conventional UMTS architecture is responsible for tracking UEs as they have mobility across different nodeBs. A convergence gateway according to the present disclosure is capable of tracking UEs within its managed sub-network of RANs, and may perform mobility management so that when data or calls come in from the core network or from the public Internet, the convergence gateway may direct the inbound traffic to the appropriate RAN directly. Each RAN being connected via IP to the convergence gateway, the convergence gateway can perform this tracking by IP address and can perform network address translation to ensure the core network has a single IP address for the UE at any particular time.

In some embodiments, the convergence gateway may interface with a conventional radio network controller (RNC) as a virtual MSC. The convergence gateway may use the standard IuCS and IuPS interfaces to communicate with the RNC, for example, to allow the RNC to interoperate with a conventional macro cell or nodeB. This enables the convergence gateway to provide 3G services to conventional nodeBs without having to emulate or reverse engineer any proprietary Iub interface, as that communication is performed by the RNC. In some embodiments the convergence gateway may use an Iur interface to communicate with conventional RNCs as a virtual RNC. In this case convergence gateway acts as a IuCS and IuPS proxy towards 3G MSC and 3G SGSN respectively. In some case convergence gateway may simply act as IuCS proxy while doing local breakout of data traffic.

4G LTE services may be provided as follows. Several possible embodiments are contemplated. In the conventional LTE architecture, voice call services are provided either as 3G voice (circuit-switched fallback or CSFB) or as data. Initial LTE deployments did not have a capability for native voice calls over LTE, and voice over LTE (VoLTE) is currently in the process of being deployed. VoLTE uses a data infrastructure known as IP Multimedia Subsystem (IMS) to provide signaling support, and uses data-based protocols such as SIP and RTP to provide voice data transport. According to conventional VoLTE, an LTE UE is attached to an LTE network and registered with an IMS core network, which then provides the ability to call other phone numbers. In the present disclosure voice calls can either be interworked to 3G CS calls or delivered using a VoLTE IMS core network; each approach has different advantages.

An LTE eNodeB is provided that is in communication with a UE. The eNodeB is also in communication with a convergence gateway, which may enable virtualization of the eNodeB and other eNodeBs by virtue of the convergence gateway acting as a B2BUA and proxy toward the LTE core network, as described elsewhere herein. When a UE attempts to connect and register with the LTE and IMS core networks, the convergence gateway establishes a data bearer for the UE with the core network, but instead of registering via IMS, performs a registration of the UE as a 3G client with the 3G MSC/VLR. The UE and the eNodeB receive confirmation that the UE is permitted to use both the LTE and IMS core networks. Next, when the UE initiates a call according to a conventional VoLTE protocol, the UE sends the appropriate SIP protocol messages toward the core network, which are interworked by the convergence gateway into 3G messages for the 3G MSC, e.g., SIP to IuCS interworking. Once the call is connected, the UE will send RTP data packets carrying voice data to the convergence gateway, which will then forward them to the aforementioned 3G RTP and IP-based MSC. This allows for transparent interworking of 4G LTE VoLTE calls to 3G calls without the need for an IMS core.

This also allows for non-VoLTE voice calls to be handled in a similar manner, transparent to the UE. For example, mobile apps such as Skype™, WhatsApp™, and other applications installed on handsets may be treated as peers and may be given the ability to make calls through the 3G MSC. Special application programming interfaces (APIs) or triggers may be used to enable special treatment of such calls, with some embodiments thereto described below.

The convergence gateway may be enabled to aggregate SCTP and S1-AP toward the core, in some embodiments, specifically for enabling a single MME to handle all of the subnetworks and eNodeBs under the convergence gateway. RTP and other IP traffic may be handled using the underlying IP backhaul connection (e.g., local breakout), in some embodiments, providing a reduction of data traffic towards the LTE SGW and PGW. RTP localization may also be provided. In some embodiments, signaling toward the core, handover optimization, paging optimization, and message retransmit reduction may be performed by the convergence gateway for subnetworks managed by the convergence gateway, as described elsewhere herein.

In some embodiments the convergence gateway may take over all of the functions of the MME, SGW, and PGW inside the LTE core network gateway. In such an embodiment, multiple convergence gateways may be used to cover a large geographic area, such as a country.

Additional functions are described for enabling Wi-Fi and small cell interoperability with the described convergence gateway. Wi-Fi and small cells may need to be authenticated before being able to connect to an operator core network, and in the conventional art two types of gateways, trusted wireless access gateways (TWAGs) and evolved packet data gateways (ePDGs) are known. The convergence gateway may be an ePDG, a TWAG, or both, in some embodiments, acting as an ePDG for untrusted Wi-Fi access points and as a TWAG for trusted Wi-Fi access points. S2 and S2x interfaces may be used to cause packet flows to be allowed entry into the LTE core network at the PGW, thus allowing Wi-Fi users to access the LTE core network. However, since 2G, 3G, and Wi-Fi are all processed as IP packets in the above scenario, S2 and S2x can be used to provide entry for sessions using each of these RATs into the LTE core network, thereby allowing a single LTE core network to provide the necessary core support for 2G, 3G, 4G LTE, and Wi-Fi. Enterprise femto networks, private LTE networks, and public safety networks can also be treated as LTE networks using the TWAG and S2/S2x approach, enabling the convergence gateway to act as a virtualized hosted small cell gateway. In some cases, a convergence gateway may do local breakout of Wi-Fi data and eliminate the need for PGW.

As 2G, 3G, 4G LTE, and Wi-Fi technologies as configured above are all able to be routed through a convergence gateway, opportunities arise for improving the performance of all the networks synergistically, such as by sharing resources or information across RATs. Self-organizing network (SON) capabilities may be leveraged across multiple technologies. For example, users can be moved to the least loaded access network by combining visibility at the convergence gateway across 3G, LTE, and Wi-Fi. Some additional techniques that may be used on the convergence gateway are described in U.S. Pat. Pub. 20140233412 and U.S. Pat. Pub. No. US20160135132, each of which is incorporated by reference in its entirety.

In some embodiments, within the convergence gateway, an access module (frontend module) is configured with a modular architecture. The access module supports a stub module for each access component. The access components depicted include: a HNB access component for 2G/3G packet-switched data and circuit-switched voice, communicating with one or more 2G/3G BTSes or nodeBs via Iuh; a HeNB access component for LTE packet-switched voice (VoLTE) and data, communicating to an eNodeB via S1; an ePDG access component for untrusted Wi-Fi access; and a SaMOG access component for trusted Wi-Fi access. Other access components may be added as well, in some embodiments.

The convergence gateway may have specific modules for: RTP-Iuh interworking; 2G data to LTE interworking via a 2G proxy; 3G data to LTE interworking via a 3G proxy; IMS to LTE interworking via an IMS proxy; 2G voice to 3G voice interworking via a 3G proxy; VoIP to 3G voice interworking via a 3G proxy; and inbound protocol switching to bind each of these RATs together.

Each of the access components provides stateless or minimally stateful forwarding and interworking of inputs from the one or more access networks to the core network components described below. Interworking may be done to a standard interface, such as S2 itself, or to a non-standard interface abstracting a subset of the input interface for communicating with the core network.

Each access component may be connected to a S2x core component (S2x backend). The S2x core component provides packet data services using one (or more) LTE core networks. The S2x core component performs interworking as necessary so that it may output on an S2 interface to its connection point in the LTE core network at the PGW. The PGW admits the packet flow from the convergence gateway as coming from another trusted network within the LTE core network, and permits access to, e.g., security gateways and authentication servers via packet data networks accessible from the PGW, thereby enabling user devices on non-LTE networks to use the LTE packet data connection.

The S2x core component and IuCS core component may be coupled together. As all RANs benefit from access to packet data, all front end access components are coupled to the S2x core component. The S2x core component may perform minimal inspection of inbound data to determine if circuit-switched call processing is needed, for example, using envelope inspection or fingerprinting. When the S2x core component identifies a circuit-switched call, the S2 core component may pass the inbound data stream to the IuCS core component. In some embodiments, circuit-switched RANs may connect directly to the IuCS core component.

Circuit-switched calls may be transported over IP and/or SCTP to the convergence gateway over an arbitrary physical medium. The convergence gateway may communicate using a BSSAP or RANAP interface to the 2G/3G cells, taking the place of and/or emulating a 2G/3G RNC in communicating with the 2G/3G RAN. Instead of communicating with an MSC, however, the convergence gateway may perform, encoding, encapsulation, and interworking of the circuit-switched calls before sending the calls to the LTE core network. For handling circuit-switched voice calls from a 2G/3G RAN, these functions may be handled by a circuit-switched component, the IuCS code component, not the S2x core component. In addition to the above interworking functions, the IuCS core component performs proxying for the 2G/3G RAN, hiding the complexity of the core network from the RAN and vice versa, so that any 2G/3G RAN will be able to interoperate with the LTE core network. Via such proxying, 2G/3G CS calls can be converted to SIP calls and handled the same as VoLTE calls by the LTE IMS core network. The Iu interface used for communicating with the RAN is standardized, and therefore the convergence gateway will be able to interoperate with a RAN from any vendor providing the standard interface. If a base station uses the IuPS interface, the convergence gateway may perform interworking from Iuh to IuPS, and perform interworking form IuPS to S1. In that way, 2G/3G/4G traffic can all be served in the unified way by one single 4G core.

In some embodiments, a transcoding gateway will not be needed. In some cases, audio for calls that originate from a 2G base station will be encoded in the half rate or full rate GSM codec. These codecs are also supported by 2.5G, 3G, and 4G handsets and base stations, so if one end of the call uses a codec that is not supported by the other, the IuCS core component can request a codec downgrade to a lowest common denominator codec. However, it may be possible for the IuCS core component to perform audio transcoding, in some embodiments. As well, the IuCS core component may perform IP-IP interworking of audio before sending the audio to the circuit-switched RAN or core.

As described above, from the radio network side, the convergence gateway presents itself as an SGSN (for packet-switched connectivity) and an RNC (for circuit-switched connectivity). At the core network, packet-switched calls may be handled as though they were VoLTE calls. This will be transparent to the core network, and will not require resources beyond what is required for support of VoLTE. 2G and 3G voice calls and circuit-switched calls may be handled by handing off to the existing 3G MSC core network node, via the IuCS interface.

Handovers between radio access networks managed by the convergence gateway may be hidden from the network. From the core network side, the calls pass through the same PGW, and no handover is needed. From the radio network side, the convergence gateway acts as an MME or RNC, and performs handover in a manner transparent to the radio network. Handovers for packet-switched calls and bearers may be performed internally within the S2x core module, and handovers for packet and circuit-switched calls may be performed between the S2x and IuCS core modules. In some embodiments, an ATCF module may be present between the S2x and IuCS core components to facilitate handover capability between circuit and packet-switched calls.

Wi-Fi local breakout and enterprise functionality may also be supported, in some embodiments. An enterprise gateway or PBX may present itself as an untrusted Wi-Fi gateway, and the convergence gateway may present itself as a ePDG to the enterprise gateway, including by using MSCHAPv2 authentication, while hiding complexity to the core network by connecting directly to the PGW. For unwanted data traffic, instead of sending the traffic to the operator's PGW, the convergence gateway may transparently redirect the traffic from the S2x core module to another network interface, thereby ejecting the traffic from the network.

The benefits of the above solution include the following. A network operator may install the convergence gateway and immediately enable voice calls over the LTE core network for one or more RANs. The operator may test the performance of the rollout gradually. The operator may, when satisfied with performance, completely deactivate both the 3G packet core and the 2G/3G circuit core, thereby reducing power and footprint requirements for their core network infrastructure. Additionally, the LTE core network itself may be simplified, as the SGW and MME nodes themselves may be subsumed by the convergence gateway. Additionally, the operator is also enabled to interwork VoLTE or Wi-Fi calls to 2G voice calls and deliver these calls over a standard 2G BTS.

Figure 12:
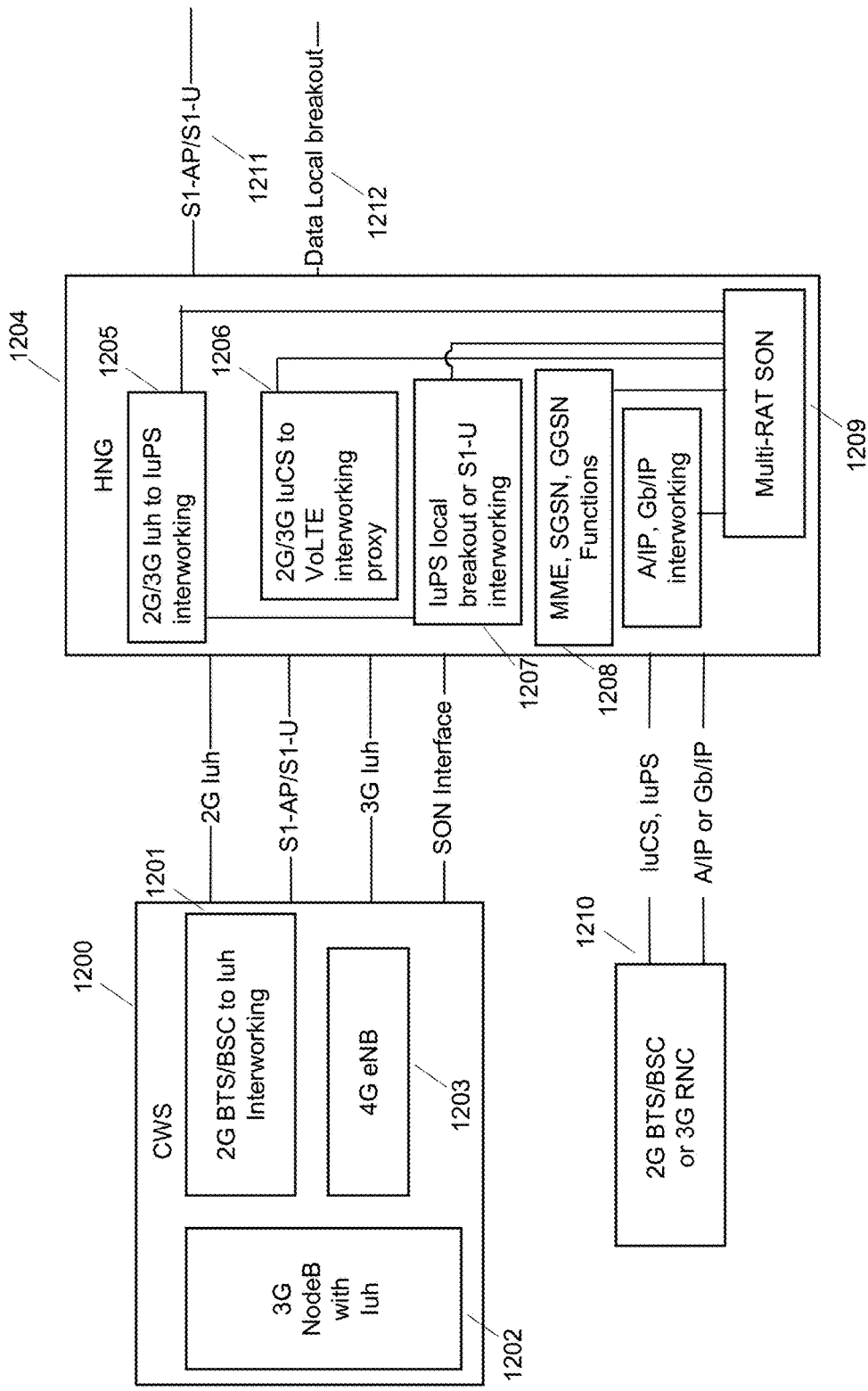
FIG. 12 is a network architecture diagram showing a block diagram of a multi-RAT node and a convergence gateway, the convergence gateway having S1 and local breakout interfaces toward a core network, in accordance with some embodiments.

Table 1 summarizes some characteristics of certain embodiments of a convergence gateway in accordance with FIG. 12.

TABLE 1

| RAT | Signaling type | HNG input signal | HNG output signal |
|---|---|---|---|
| 2G | Signaling | A/IP or Gb/IP | Interworking to VoLTE or absorbed at local GGSN/SGSN |
|  | Signaling (Iuh) | Iuh | IuCS to VoLTE and IuPS to local breakout or S1-U |
|  | Calls | A/IP | Interworking to VoLTE |
|  | Data | Gb/IP | Local breakout or S1-U |
| 3G | Signaling | Iuh | Absorbed at local SGSN/GGSN, or interworking to VoLTE and local breakout or S1-U |
|  | Calls | IuCS | Interworking to VoLTE |
|  | Data | IuPS | Local breakout or S1-U |
| 4G | Signaling | S1-AP | Absorbed at local MME, or S1-AP to 4G core |
|  | Calls (VoLTE) | S1-U | Local breakout or interworking to VoLTE, IMS core via S1-U |
|  | Data | S1-U | Local breakout or S1-U |
| Wi-Fi, etc. | Signaling | S2a/S2b | Absorbed at local MME, or S2a/S2b to 4G core, or local breakout |
|  | Calls (VoLTE) | S2a/S2b | S2a/S2b to PGW to IMS core, or local breakout |
|  | Data | S2a/S2b | S2a/S2b to 4G core, or local breakout |

The term "absorbed" is used above to reflect the notion of virtualization, described in various applications referenced herein, i.e., that a gateway may pass only certain signaling messages up to the core network and may respond to core network queries or call flows directly by proxying the relevant signaling messages. This enables the convergence gateway to flexibly provide handover, etc. services among multiple RATs and multiple base stations it manages.

In some embodiments, a phased approach could be used to introduce convergence gateway architecture to an operator's wireless network. Four proposed phases are described below.

Figure 3:
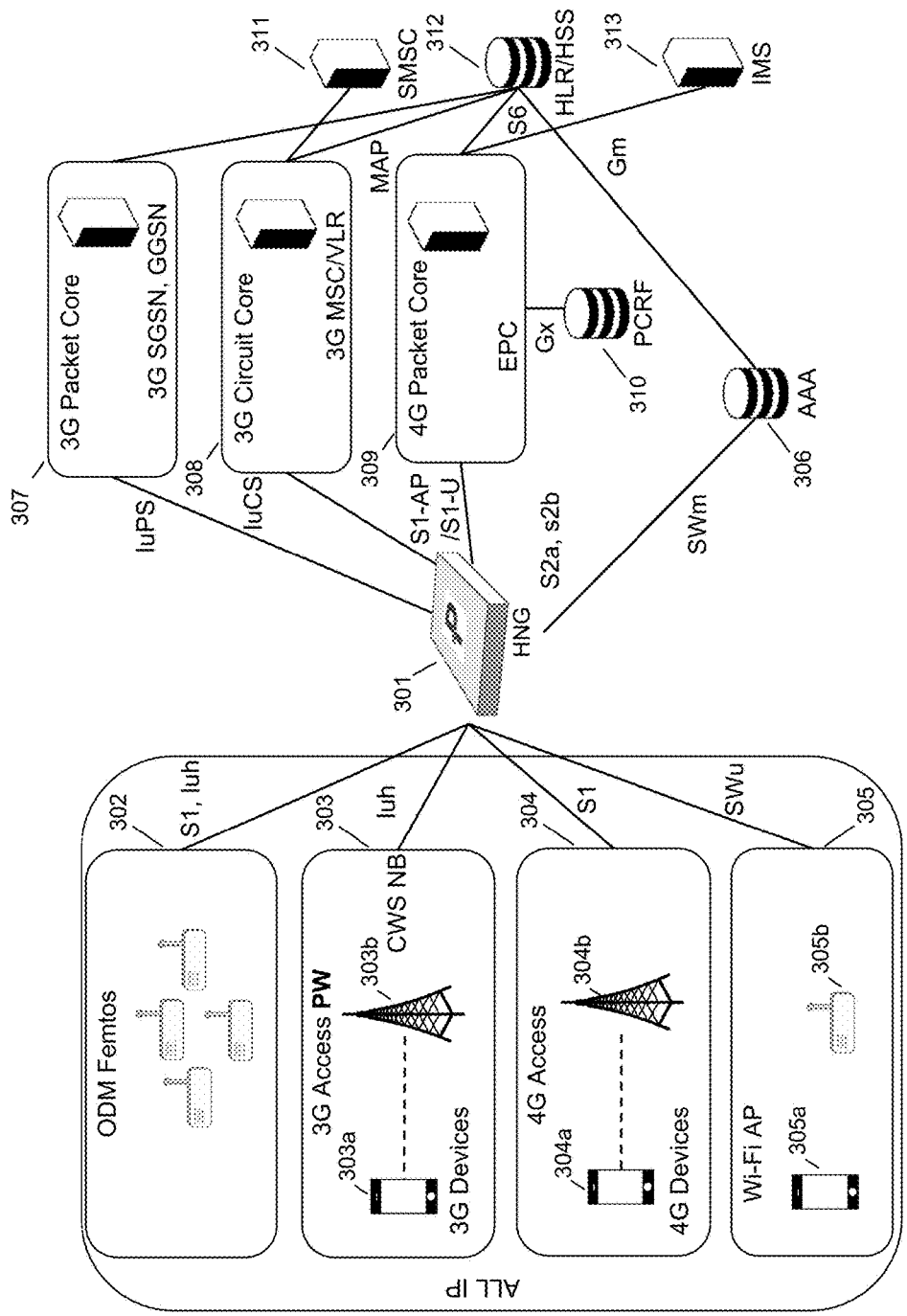
FIG. 3 is a network architecture diagram showing a first phase of introduction of a convergence gateway into a wireless operator network, in accordance with some embodiments.

In Phase 1, shown as FIG. 3, a wireless operator could introduce a convergence gateway into the network for LTE, for 3G, and for Wi-Fi, maintaining an existing 3G packet core and 3G circuit core, as well as 4G packet core/EPC. This architecture provides advantages for scalability of existing services. Additionally, it enables Wi-Fi calling, as well as 3G access, 4G access, and standards-compliant femto cells (original device manufacturer, or ODM, femtos) from a variety of manufacturers, and also provides the convergence gateway's virtualization, scalability, SON, and other advantages. Use of enhanced nodeBs as described herein can also permit all RAN traffic to be on IP, providing cost savings.

In an alternative Phase 1 deployment, a wireless operator could introduce a convergence gateway into the network for LTE, with support for outdoor macro, enhanced multi-RAT base stations (such as the Parallel Wireless CWS™ base station), and generic femto cells (residential, enterprise); introduce a convergence gateway for 3G, with Parallel Wireless CWS, generic femto cells (residential, enterprise); and introduce a convergence gateway for Wi-Fi, enabling a VoWiFi calling offering and a carrier Wi-Fi offering. Benefits include: virtualizing the existing core and adding more capacity by offloading signaling & data; enabling Femto offerings; VoWiFi; SON & Inter cell Interference coordination; CAPEX/OPEX savings; and public transport Wi-Fi and small cells.

Figure 4:
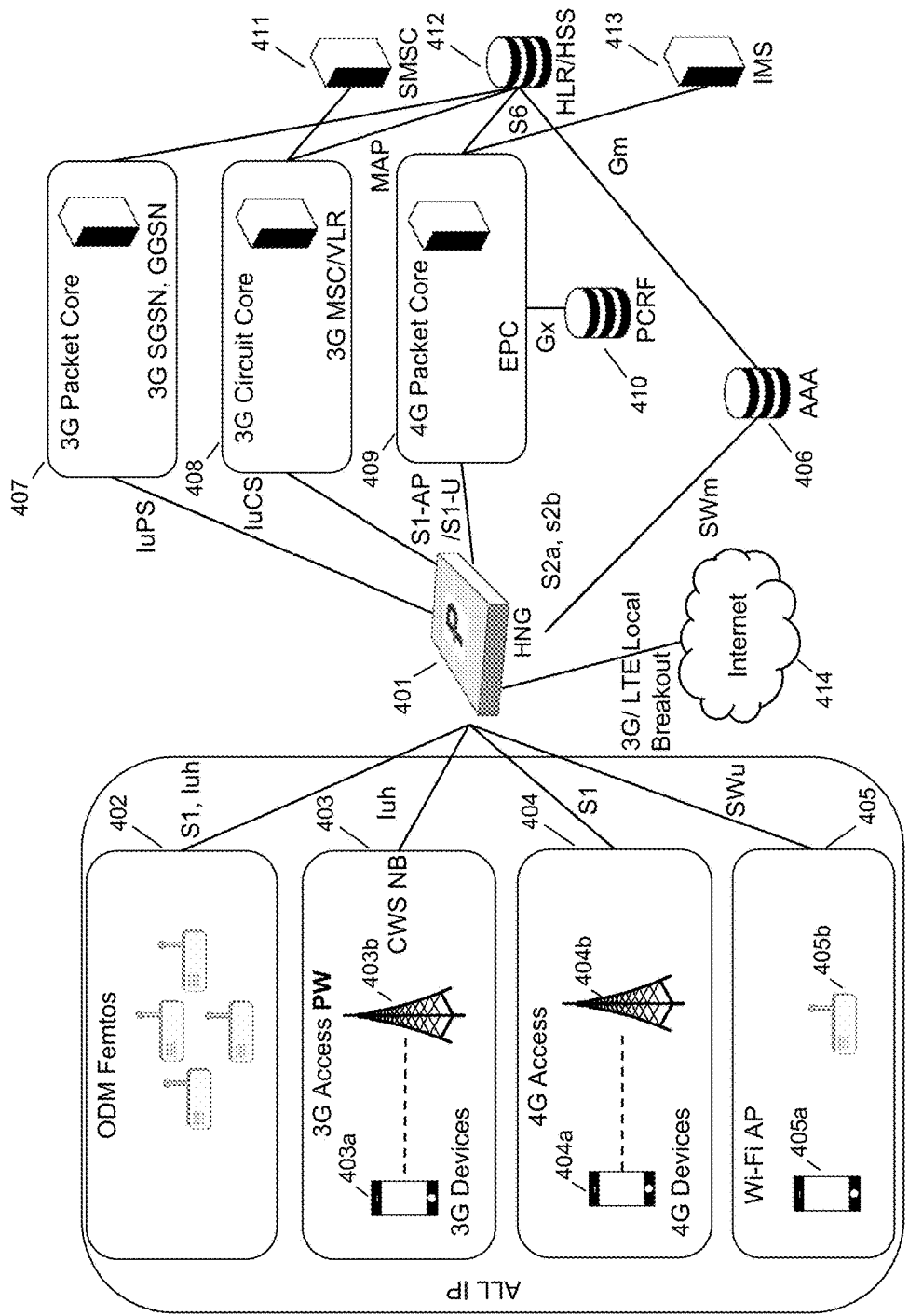
FIG. 4 is a network architecture diagram showing a second phase of introduction of a convergence gateway into a wireless operator network, in accordance with some embodiments.

In Phase 2, shown as FIG. 4, an operator may enable LTE local breakout in the convergence gateway, which reduces traffic towards PGW and thereby eliminates the need to scale it; call detail record (CDR) generation; legal intercept (LI) integration; and may enable 3G data local breakout in the convergence gateway, which reduces traffic towards GGSN (eliminates the need to scale it); CDR generation; LI integration. Virtualizing the data offload frees up (or eliminates) PGW, SGSN, and enables the following functions: Femto offerings with local breakout; Low latency traffic to the internet (including cached video); Private LTE network; and CAPEX/OPEX savings.

Figure 5:
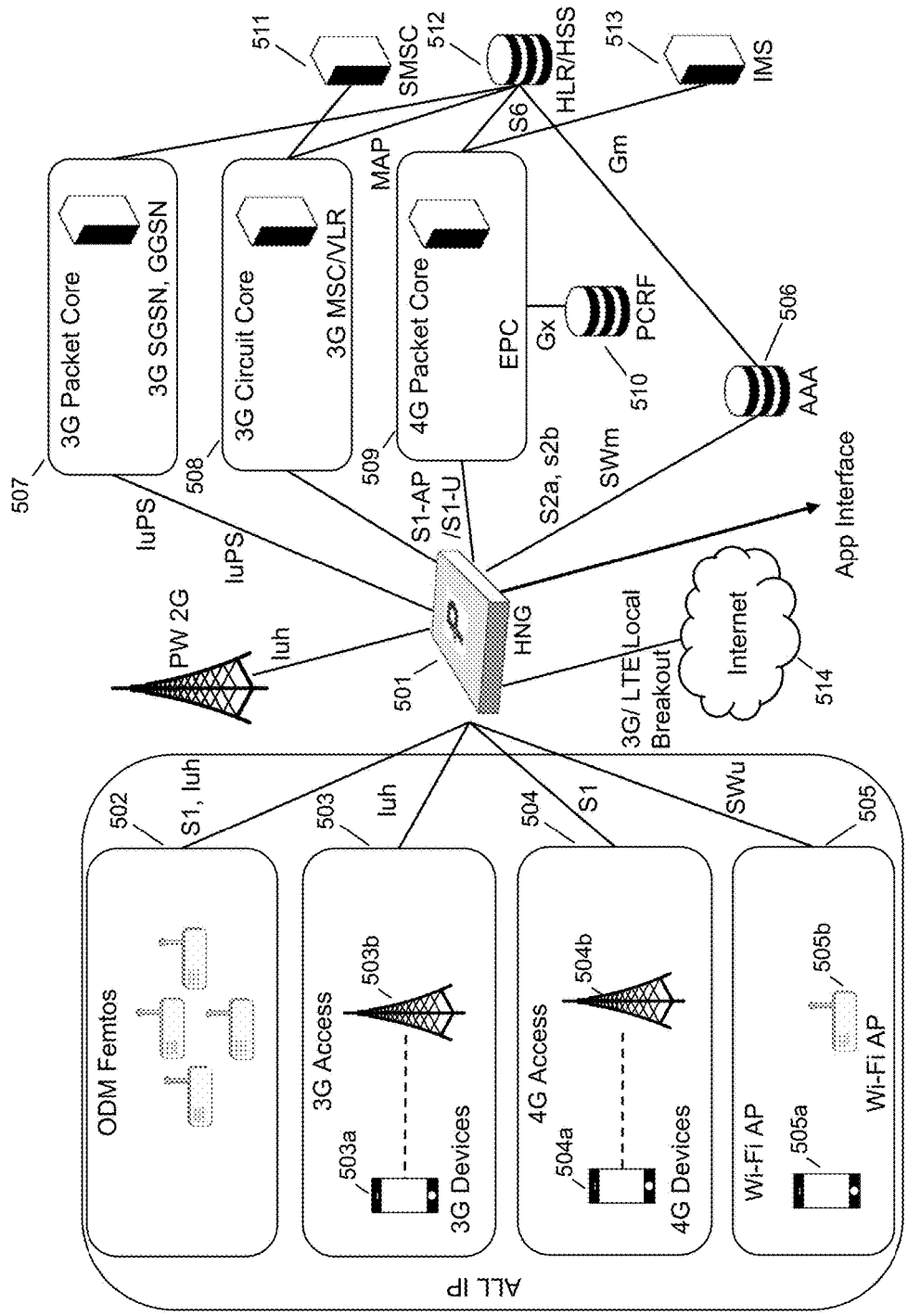
FIG. 5 is a network architecture diagram showing a third phase of introduction of a convergence gateway into a wireless operator network, in accordance with some embodiments.

In Phase 3, shown as FIG. 5, an operator may enable a virtual MSC on the convergence gateway for existing 3G Macros. This enables RTP localization; enables optimized HO; eliminates need for MSC, SGSN, GGSN scaling. This also provides the following feature advantages: SON; API Enablement; smartphone apps; IOT/M2M; Femto support. Virtualizing the MSC adds more capacity in the network by offloading the existing MSC. An app framework for innovative smartphone applications may be enabled. This phase also enables: RTP localization; optimized handover; and eliminates the need for MSC, SGSN, GGSN scaling; New revenue streams from apps and CAPEX/OPEX savings may also result.

Figure 6:
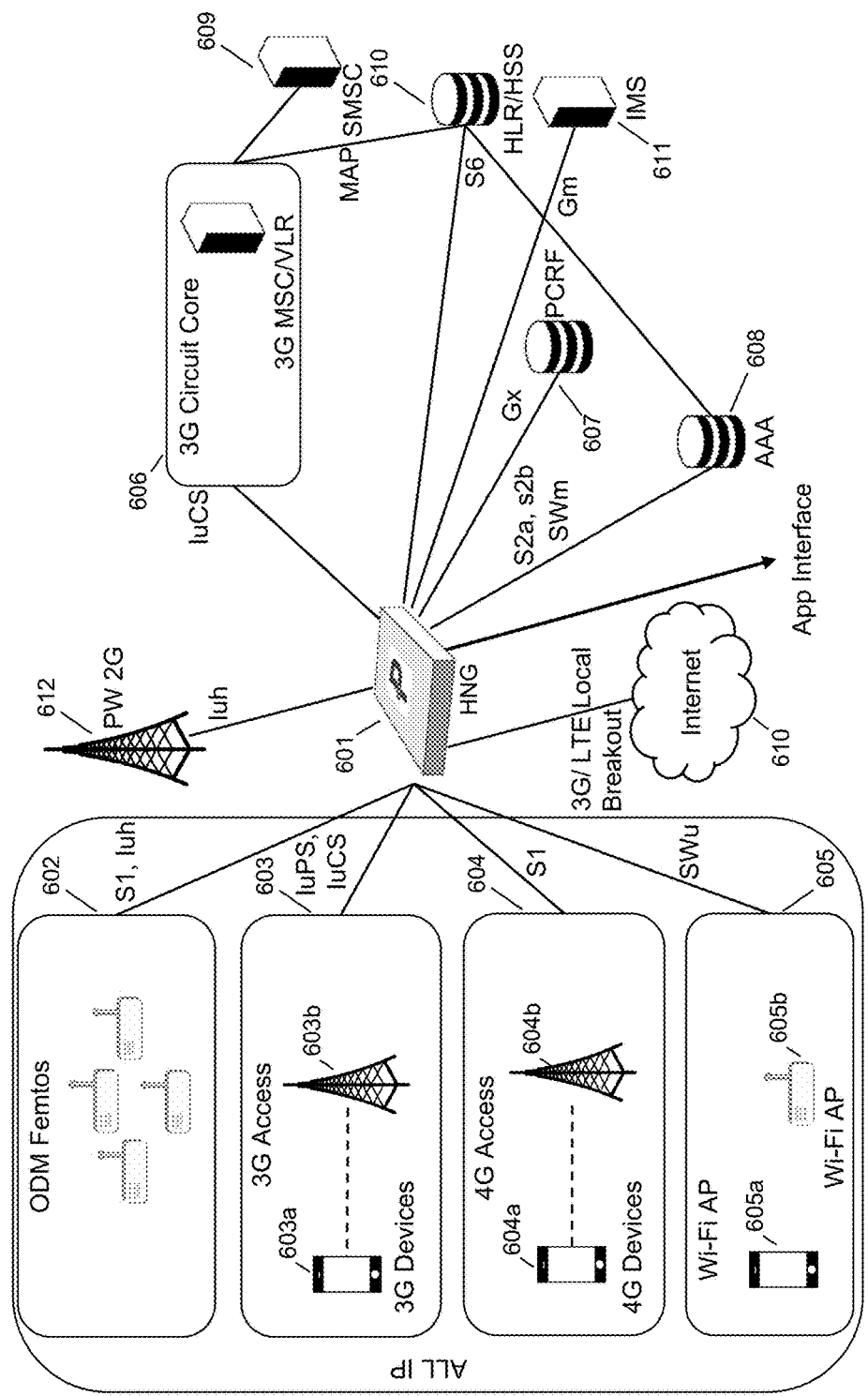
FIG. 6 is a network architecture diagram showing a fourth phase of introduction of a convergence gateway into a wireless operator network, in accordance with some embodiments.

In Phase 4, shown as FIG. 6, the convergence gateway absorbs MME and SGSN functionality. While the operator may continue to use circuit switched voice MSC for voice for legacy applications (including non-VoLTE), the operator may enable mobile edge computing (MEC) for exotic applications. This Simplified Virtualized Core Network is scalable on commodity hardware in a data center, and ready for 5G, with significant CAPEX and OPEX Savings, and on modern management interfaces.

The phases described above are suitable for a gradual phase-in of a simplified core network that preserves user experience while enabling the operator to reduce OPEX over time. An additional IP-only architecture is described below for greenfield applications.

Figure 7:
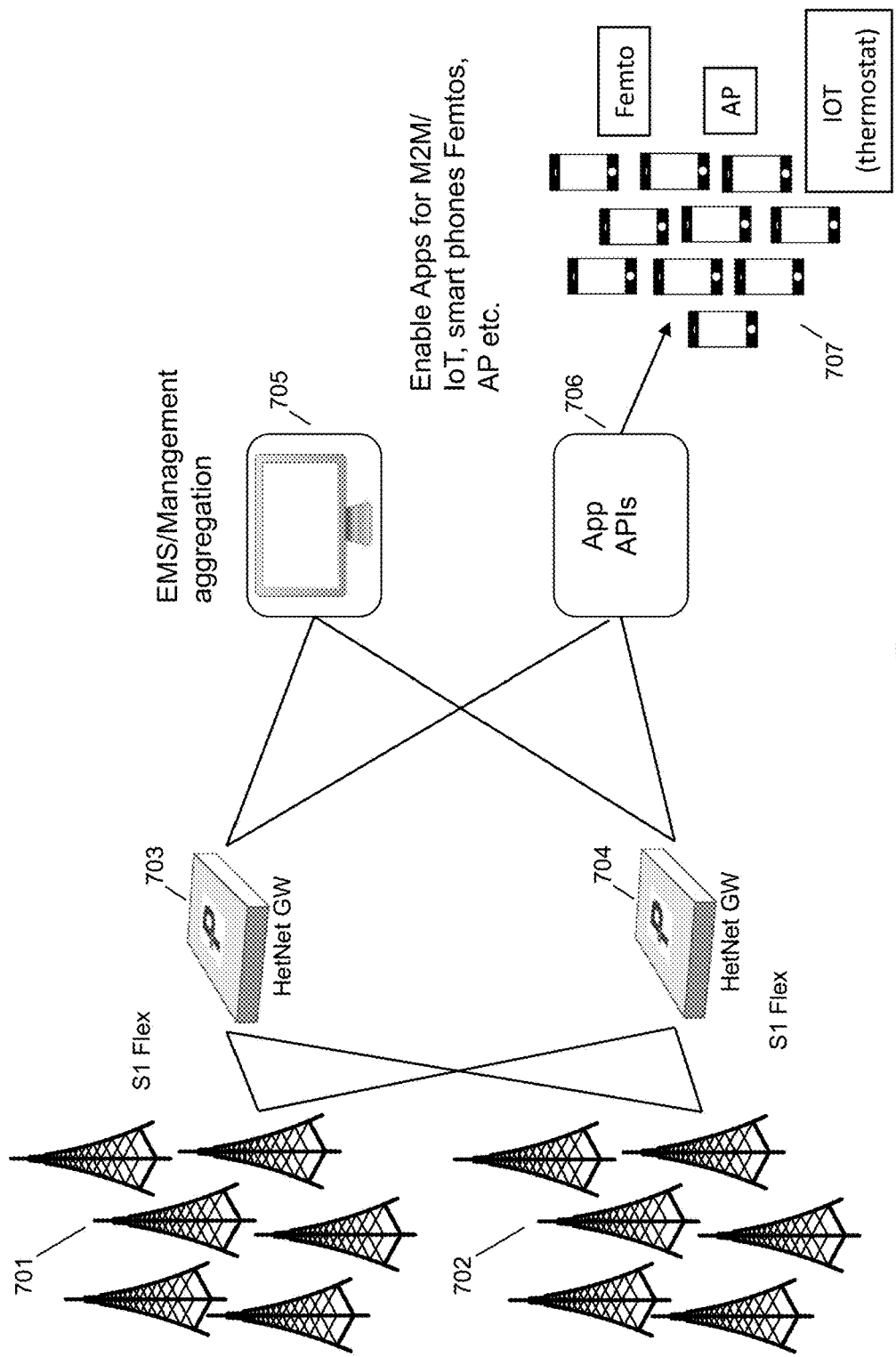
FIG. 7 is a network architecture diagram showing providing applications (apps) for machine-to-machine (M2M) applications, smartphones, femto cells, access points (APs), etc, in accordance with some embodiments.

FIG. 7 shows a conceptual architecture for providing apps for machine-to-machine (M2M) applications, smartphones, femto cells, APs, etc. Apps may be supported using APIs that are provided at the convergence gateway, with EMS/management aggregation of the smartphones and M2M clients being enabled via the apps and the convergence gateway using an element management system (EMS) accessing records and data collected at the convergence gateway. The convergence gateway may use an S1-flex interface or another interface to interact with a wireless network.

In some embodiments, the convergence gateway may enable integration of VoIP calls with ordinary cellular voice calls. Carriers want to provide mobile App to offer value added services along with VoIP calling. Typically VoIP apps are not tightly coupled with mobile OS, but are instead pushed to the background when mobile phone receives a phone call, which can create unwanted results (e.g., termination of the VoIP call) when VoIP apps are in middle of phone calls. It is desired to coordinate native mobile calls with mobile apps to improve the user experience.

In one embodiment, IN triggers are used to provide integration. IN Triggers are old way of creating triggers to be able to do intelligent services. See Reference (http://www.3g4g.co.uk/Tutorial/ZG/zg_camel.html). While they work well for popular IN services e.g. Number Portability, 800 number lookup etc., they are difficult and very expensive for new & innovative services due to old/unsupported nature of this technology.

In another embodiment, a Number Portability Trigger may be used. This approach assumes a SIP soft switch that handles VoIP app calling. Normal SIP related call features are assumed i.e. active registration status, active call status, SIP call forking etc. LRN (Local Routing Number) in the number portability database is registered for the VoIP app users. LRN resides on SIP Soft Switch. In case of actual ported number, Soft Switch needs to take care of final LRN. The soft switch is provided at the convergence gateway.

In another embodiment, a call flow using a Next hop soft switch provided at the convergence gateway is detailed. This approach assumes a SIP soft switch that handles VoIP app calling. Normal SIP related call features are assumed i.e. active registration status, active call status, SIP call forking etc. All calls before going to MSC are routed via Soft Switch (using numbering plan/routing tables). Soft Switch decides if it should deliver call to the App via VoIP or native dialer via MSC.

In another embodiment, a further call flow using a convergence gateway is detailed, based on idea to use the convergence gateway as a virtual decentralized core. The convergence gateway is configured to enable an API for VoIP app to leverage and achieve similar result, i.e. get trigger for incoming calls and many other innovative services e.g. location based trigger. This convergence gateway based solution allows a user or operator to bypass long distance/international carriers (among subscribers) by local breakout for even native dialer calls.

In another embodiment, a mobile OS native dialer is integrated with a VoIP dialer, streamlining the UI to improve presentation of the problem, and treating VoIP calls as equal to native calls for, e.g., phonebook presentation for outgoing calls and incoming call identification, hold and merge.

In one embodiment, a convergence gateway API may be made available to reroute ordinary circuit-switched (CS) calls. This API may be configured and exposed at the convergence gateway, and may be accessed using a specially configured phone or using an app on a smartphone. This may reroute existing CS calls from the smartphone to directly connect to other nodes that are accessible on the network, creating a peer-to-peer or local network topology, and avoiding a "hairpinning" route topology that goes out to a gateway and back into the same local network.

Figure 8:
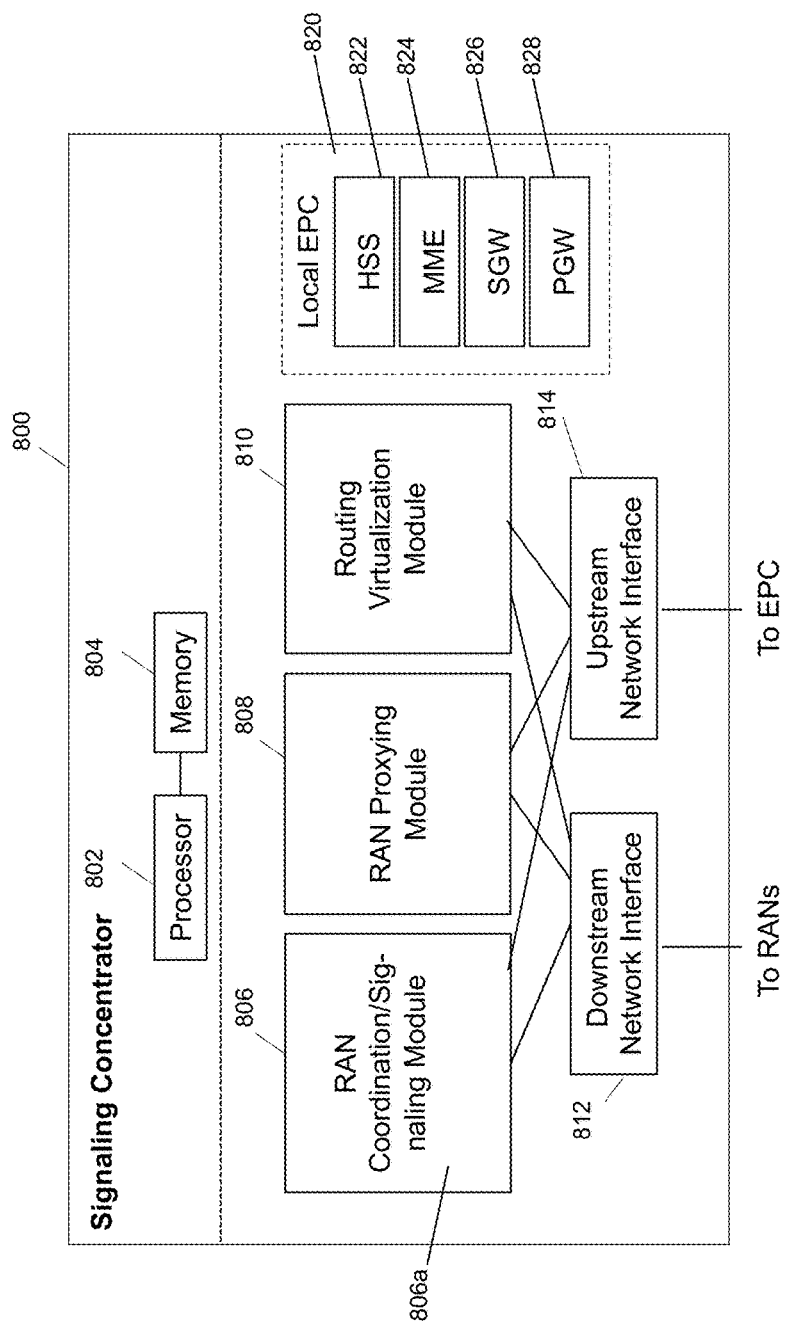
FIG. 8 is a network architecture diagram showing a block diagram of a convergence gateway, in accordance with some embodiments.

FIG. 8 is a network architecture diagram showing a block diagram of a convergence gateway, in accordance with some embodiments. Signaling coordinator 800 includes processor 802 and memory 804, which are configured to provide the functions described herein. Also present are radio access network coordination/signaling (RAN Coordination and signaling) module 806, RAN proxying module 808, and routing virtualization module 810.

RAN coordination module 806 may include database 806a, which may store associated UE signal quality parameters and location information as described herein. In some embodiments, SON coordinator server 800 may coordinate multiple RANs using coordination module 806. If multiple RANs are coordinated, database 806a may include information from UEs on each of the multiple RANs.

In some embodiments, the coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet). Signaling storm reduction functions may be performed in module 806.

SON coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

Figure 9:
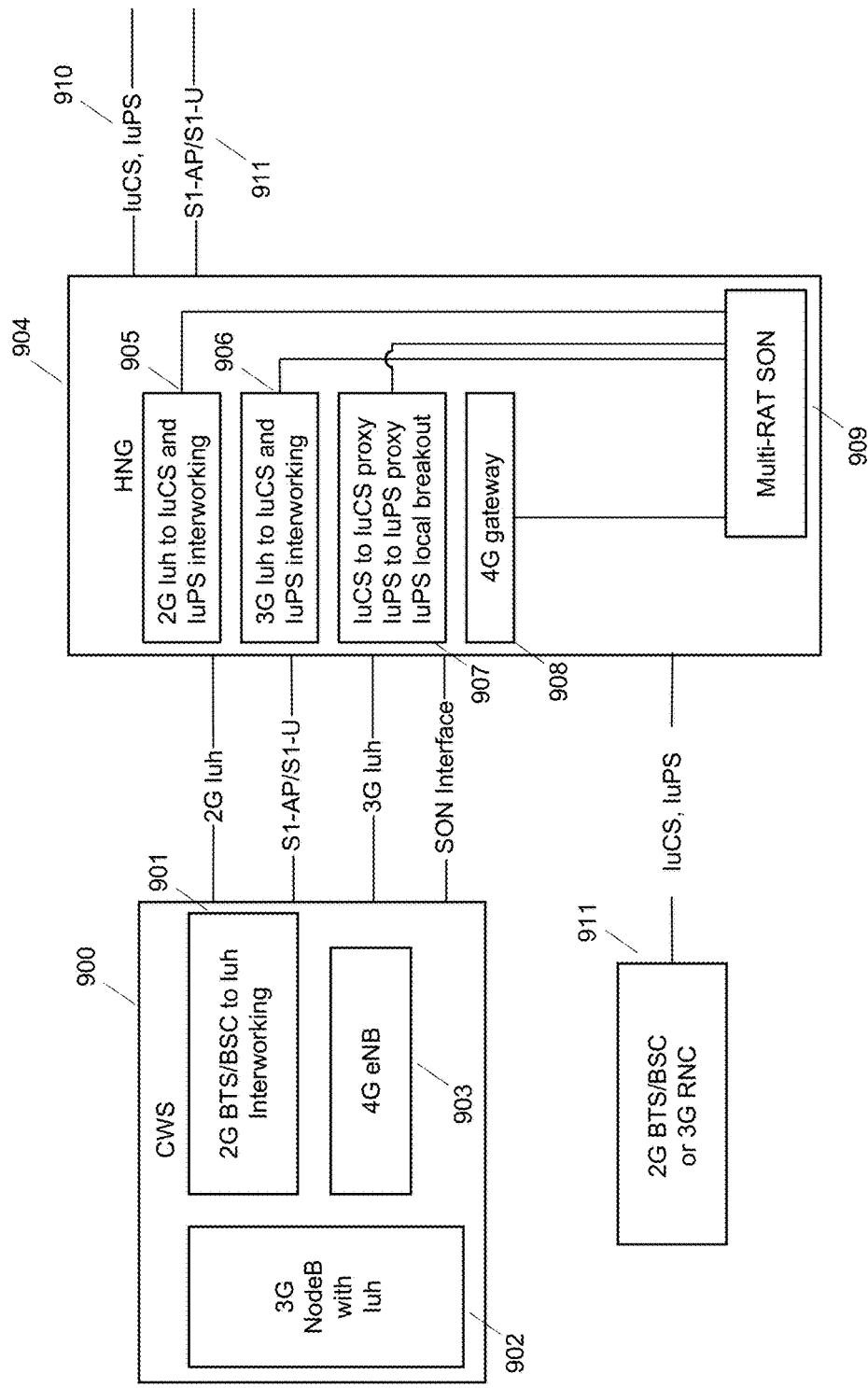
FIG. 9 is a network architecture diagram showing a block diagram of a multi-RAT node and a convergence gateway, the convergence gateway having IuCS/IuPS and S1 interfaces toward a core network, in accordance with some embodiments.

FIG. 9 is a network architecture diagram showing a block diagram of a multi-RAT node and a convergence gateway, the convergence gateway having IuCS/IuPS and S1 interfaces toward a 3G and 4G-capable core network, in accordance with some embodiments. CWS 900 is a Parallel Wireless enhanced base station, with 2G RAT 901 including BTS and BSC, as well as Iuh interworking; 3G RAT nodeB 902, with Iuh as well; and a 4G eNodeB 903. CWS 900 is in communication with HNG 904, which is a Parallel Wireless convergence gateway, over four interfaces: 2G Iuh; 3G Iuh; S1-AP/S1-U for 4G; and a SON interface.

HNG 904 includes 2G interworking module 905, 3G interworking module 906, and Iu proxy module 907. 2G interworking module 905 takes Iuh and interworks it to IuCS and IuPS. Similarly, 3G interworking module 906 takes Iuh and interworks it to IuCS and IuPS. Once converted to IuCS or IuPS, IuCS/IuPS proxy 907 acts as a proxy for communications with a 3G core network, which natively supports IuCS/IuPS, over IuCS/IuPS interface 910.

As well, HNG 904 is in communication with a standard 2G or 3G base station, shown as 911 2G BTS/BSC or 3G RNC. This communication is over IuCS/IuPS and not over Iuh; however, IuPS and IuCS are able to be handled by HNG 904 and can be proxied over to the 3G core network via interface 910.

HNG 904 also includes 4G gateway 908 and multi-RAT SON module 909. The 4G gateway simply provides a proxy and gateway for the 4G eNodeB 903 to S1-AP/S1-U interface 911, which connects natively to the 4G EPC. The SON module performs SON functionality as described herein, which generally includes looking at load statistics and changing thresholds; looking at all data being collected, including subscriber information and call state information; analytics; intelligent decisions; and proactive, as well as reactive action. The SON module is connected to all RATs, all proxies, and all core networks, and can use that information to provide multi-RAT SON functionality.

Figure 10:
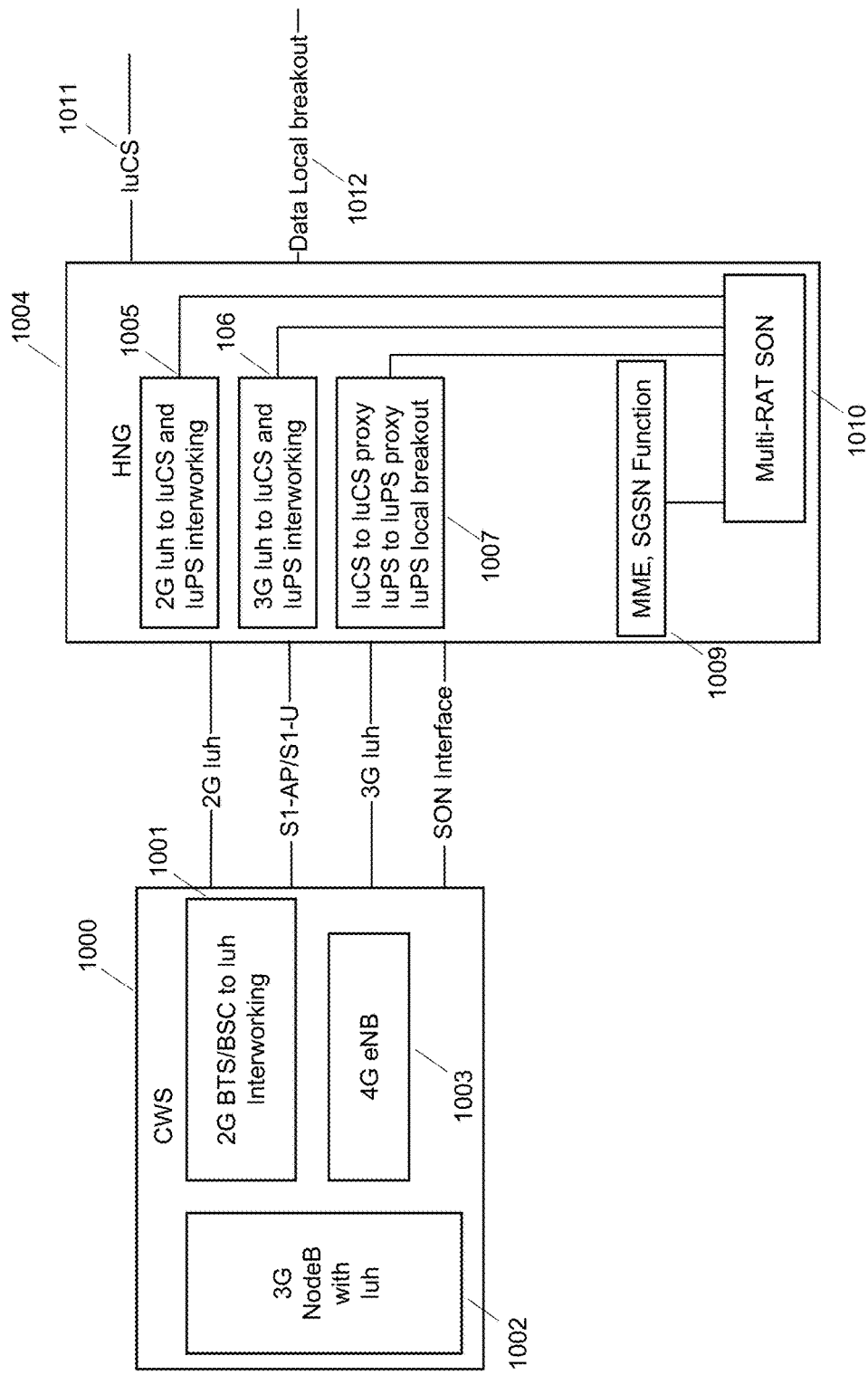
FIG. 10 is a network architecture diagram showing a block diagram of a multi-RAT node and a convergence gateway, the convergence gateway having IuCS and local breakout interfaces toward a core network, in accordance with some embodiments.

FIG. 10 is a network architecture diagram showing a block diagram of a multi-RAT node and a convergence gateway, the convergence gateway having IuCS and local breakout interfaces toward a core network, in accordance with some embodiments. Similar to FIG. 9, multi-RAT CWS 1000 includes 2G BTS/BSC 1001, which has its own built-in Iuh interworking; 3G NodeB with Iuh 1002; and 4G eNodeB 1003. Similar to FIG. 9, 2G Iuh, 3G Iuh, S1, and SON are the four inbound interfaces to HNG 1004. However, HNG 1004 has two outbound interfaces: an IuCS interface 1011, toward a 3G core network, and a data local breakout interface 1012, directly facing the Internet. This architecture is suitable when a network operator is using a public network for backhaul, for instance.

A 2G Iuh-IuCS/IuPS proxy 1005 and a 3G Iuh-IuCS/IuPS proxy 1006 may be provided, as well as an IuCS proxy, an IuPS proxy, and an IuPS local breakout module 1007.

Since IuCS is available, 2G and 3G circuit-switched calls are interworked to IuCS, and they are sent out over IuCS interface 1011. However, since IuPS is not available and S1 is not available, all data connections, including S1-U and IuPS, are interworked to GTP-U tunnels or bare IP packets and are sent out over data local breakout interface 1012.

In some embodiments, an MME and an SGSN function are built into the HNG 1004 to absorb these communications before they are sent to the core network, thereby reducing demand for signaling data. A SON module 1010 is also provided.

Figure 11:
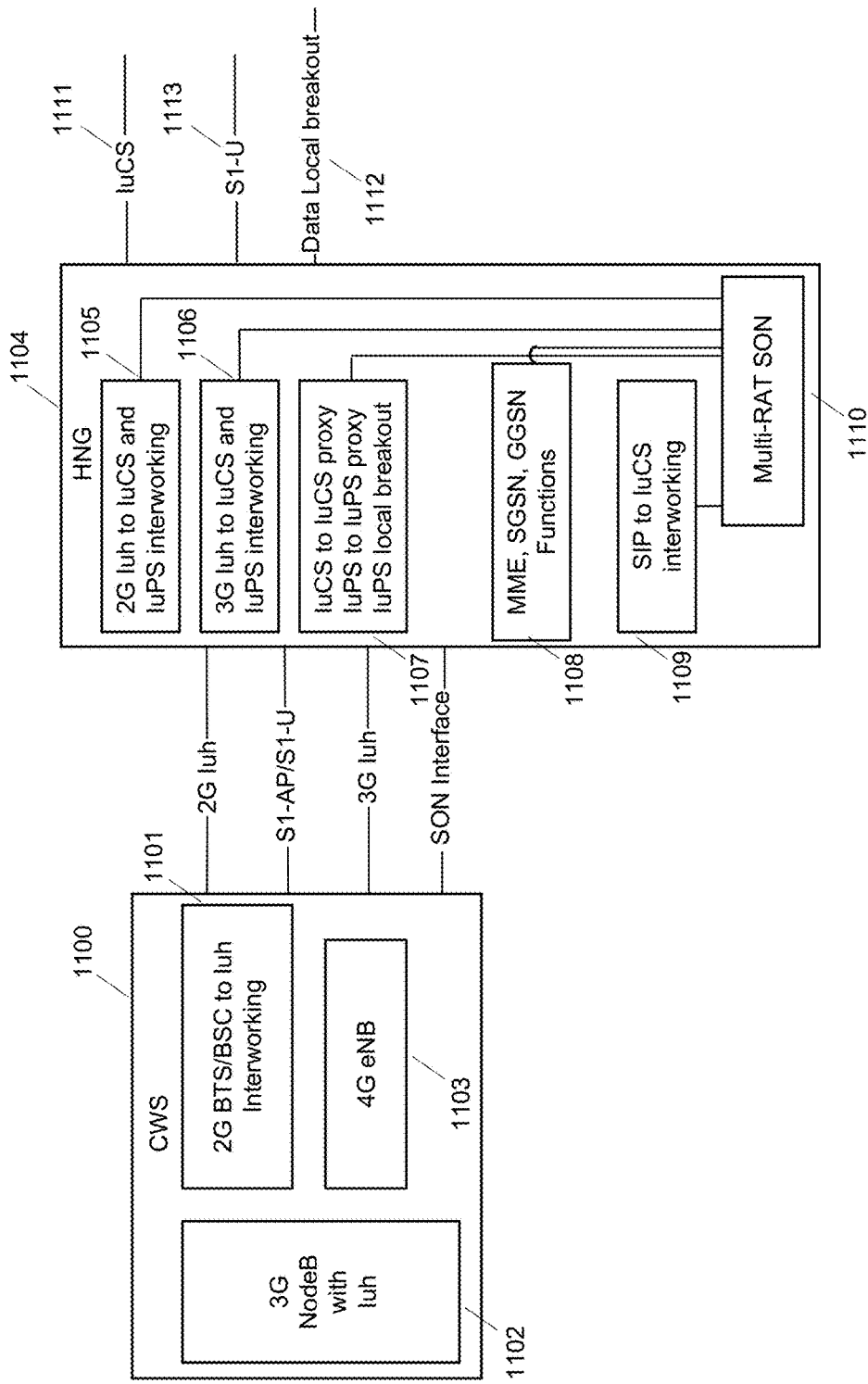
FIG. 11 is a network architecture diagram showing a block diagram of a multi-RAT node and a convergence gateway, the convergence gateway having IuCS, S1, and local breakout interfaces toward a core network, in accordance with some embodiments.

FIG. 11 is a network architecture diagram showing a block diagram of a multi-RAT node and a convergence gateway, the convergence gateway having IuCS, S1, and local breakout interfaces toward a core network, in accordance with some embodiments. Similar to FIG. 9, multi-RAT CWS 1100 includes 2G BTS/BSC 1101, which has its own built-in Iuh interworking; 3G NodeB with Iuh 1102; and 4G eNodeB 1103. Similar to FIG. 9, 2G Iuh, 3G Iuh, S1, and SON are the four inbound interfaces to HNG 1104. However, HNG 1104 has three outbound interfaces: an IuCS interface 1111, toward a 3G core network, an S1-U interface 1113, toward a 4G core network, and a data local breakout interface 1112, directly facing the Internet. This configuration is suitable when backhaul directly to a 4G core network is available.

HNG 1104 also includes, in addition to interworking modules 1105, 1106, 1107 and SON module 1110, additional MME/SGSN/GGSN functions 1108 and SIP to IuCS interworking 1109. SIP interworking enables VOLTE and VOIP to be interworked to 3G and completed over IuCS interface 1111. Since an MSC is maintained in this embodiment, 3G voice calls are able to be completed.

FIG. 12 is a network architecture diagram showing a block diagram of a multi-RAT node and a convergence gateway, the convergence gateway having S1 and local breakout interfaces toward a core network, in accordance with some embodiments. CWS 1200 is similar to CWS 1100. Base station 1210 is a 2G BTS/BSC or 3G RNC, and uses either IuCS/IuPS, A over IP/Gb over IP, or both, to connect to HNG 1204. HNG 1204 has two outbound connections: S1 connection 1211 and data local breakout 1212. HNG 1204 does not have a circuit-switched outbound connection; this configuration does not require a 3G core network and uses IMS to complete all calls. As a result, A/IP and IuCS must be interworked to VoLTE using an interworking proxy. This interworking proxy may require transcoding.

In some embodiments, the base stations described herein may be compatible with a Long Term Evolution (LTE) radio transmission interface or air interface. The LTE-compatible base stations may be eNodeBs. In addition to supporting the LTE interface, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency interfaces, and may also support transmit power adjustments for some or all of the radio frequency interfaces supported.

In some embodiments, interworking is used herein to mean providing all, or a subset of, the functionality provided by a particular protocol or interface. The inventors have appreciated that providing the most important features of a particular protocol or interface may enable an operator to provide a good balance of user experience with reduced costs. In some embodiments, interworking to VoLTE may be instead interworked to VOIP and vice versa. In some embodiments, Iuh may be provided at the base station; in other embodiments Iuh may be provided at the convergence gateway.

As described herein, a data flow router may be a gateway, in some embodiments; a proxy may be a B2BUA, an interworking proxy, or a transparent gateway, in some embodiments; and a proxy may provide virtualization, as described elsewhere herein, in some embodiments.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional interfaces that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A system for multi-radio access technology (multi-RAT) telecommunications networking, comprising:
 a multi-RAT gateway, the multi-RAT gateway further comprising:
  an inbound Iuh interface for handling inbound signaling, call, and user data flows on either or both of a 2G RAT or a 3G RAT;
  an inbound IuCS interface for handling inbound call data flows on either or both of the 2G RAT or the 3G RAT, the inbound IuCS interface being coupled to the inbound Iuh interface;

an inbound IuPS interface for handling inbound user data flows on either or both of the 2G RAT or the 3G RAT, the inbound IuPS interface being coupled to the inbound Iuh interface;

an inbound S1-AP interface for handling 4G inbound signaling data flows;

an inbound S1-U interface for handling 4G inbound user data flows;

a Voice over LTE (VoLTE) interworking proxy for performing interworking from inbound call data flows, the VoLTE interworking proxy being coupled to the inbound IuCS interface; and an outbound data flow router for routing inbound user data flows on either, some, or all of 2G, 3G, or 4G user data flows to either an outbound S1 interface or an outbound local breakout IP interface, wherein the VoLTE interworking proxy is further coupled to the outbound data flow router such that outbound VoLTE traffic flows destined for an Internet Protocol Multimedia Subsystem (IMS) core network are routed to either the outbound S1 interface or the outbound local breakout IP interface, and wherein the inbound S1-AP interface and the inbound S1-U interface are further coupled to the outbound data flow router.

2. The system of claim 1, wherein the inbound S1-U interface is further configured to route inbound VoLTE traffic flows to the outbound data flow router.

3. The system of claim 1, further comprising local core network functions, the local core network functions comprising a local serving GPRS support node (SGSN) function, a local gateway GPRS support node (GGSN) function, and a local mobility management entity (MME) function, the local core network functions providing termination of data flows.

4. The system of claim 1, further comprising an IMS core network for providing voice call anchoring for VoLTE voice data flows.

5. The system of claim 1, wherein each of the radio access technology gateway functions provide inbound interfaces for signaling, voice calls, and user data.

6. The system of claim 1, wherein each of the radio access technology gateway functions provide either interworking for inbound flows to an outbound IP-based interface or routing to a local core network function that acts to terminate inbound flows.

7. The system of claim 1, further comprising a multi-radio access technology (multi-RAT) base station supporting 2G with an Iuh signaling interface, 3G with an Iuh signaling interface, and 4G with an S1-AP signaling interface.

8. The system of claim 1, further comprising a 2G base station interface providing A/IP and Gb/IP signaling, voice call, and data inbound interfaces, and A/IP and Gb/IP interworking to outbound IP-based data or to an outbound Voice over LTE (VoLTE) interface via a VoLTE interworking proxy.

9. The system of claim 1, further comprising a multi-radio access technology (multi-RAT) base station supporting a wireless local area networking (WLAN) radio access technology (RAT) with an S2a or S2b signaling interface, and wherein the multi-RAT gateway further comprises support for S2a/S2b signaling, Voice over LTE (VoLTE) proxy interworking for S2a/S2b voice calls, and support for redirection of S2a/S2b data to an operator core network packet gateway (PGW) or to the Internet via local breakout.

10. The system of claim 1, further comprising a Session Initiation Protocol (SIP) protocol connection interworking proxy for interworking IuCS and A/IP calls to Voice over LTE (VoLTE) calls, or for interworking SIP calls to IuCS calls.

11. The system of claim 10, the SIP protocol connection interworking proxy further comprising a transcoder.

12. The system of claim 1, wherein the multi-RAT gateway provides an application programming interface (API) to enable interaction of a Voice over IP (VoIP) smartphone application with a voice call at the multi-RAT gateway without requiring support in a 3G circuit-switched core network or an IP Mobile Subsystem (IMS) core network.

13. The system of claim 1, wherein the multi-RAT gateway further comprises a self-organizing network (SON) module coupled to each of the inbound and outbound interfaces and proxies, the SON module for monitoring network state, subscriber information, and/or call state information across radio access technologies and proactively reconfiguring operating parameters at the multi-RAT gateway.

* * * * *